United States Patent [19]

Tsuchida

[11] Patent Number: 5,004,329

[45] Date of Patent: Apr. 2, 1991

[54] VARI-FOCAL LENS SYSTEM

[75] Inventor: Hirofumi Tsuchida, Tokyo, Japan

[73] Assignee: Olympus Optical Co., Ltd., Tokyo, Japan

[21] Appl. No.: 552,296

[22] Filed: Jul. 13, 1990

[30] Foreign Application Priority Data

Jul. 14, 1989 [JP] Japan .................. 1-180180

[51] Int. Cl.$^5$ .......... G02B 15/14; G02B 13/18
[52] U.S. Cl. .................. 350/427; 350/432
[58] Field of Search .......... 350/423, 427, 432–435

[56] References Cited

U.S. PATENT DOCUMENTS

| 4,701,033 | 10/1987 | Masumoto | 350/423 X |
| 4,773,744 | 9/1988 | Yamanashi | 350/432 X |
| 4,822,152 | 4/1989 | Yamanashi | 350/427 |
| 4,840,467 | 6/1989 | Takada et al. | 350/427 |
| 4,854,682 | 8/1989 | Yamanashi | 350/432 X |

FOREIGN PATENT DOCUMENTS 62-264019 11/1987 Japan .
63-153511 6/1988 Japan .
64-88512 4/1989 Japan .

Primary Examiner—Scott J. Sugarman
Attorney, Agent, or Firm—Cushman, Darby & Cushman

[57] ABSTRACT

A vari-focal lens system comprising a plurality of lens units including a lens unit arranged on the extremely image side and having a negative refractive power, and adapted so as to perform variation of focal length by moving the lens units, said negative lens unit being composed, in the order from the object side, of a front subunit consisting of at least one negative lens unit and a rear subunit consisting of at least one negative lens element.

12 Claims, 18 Drawing Sheets

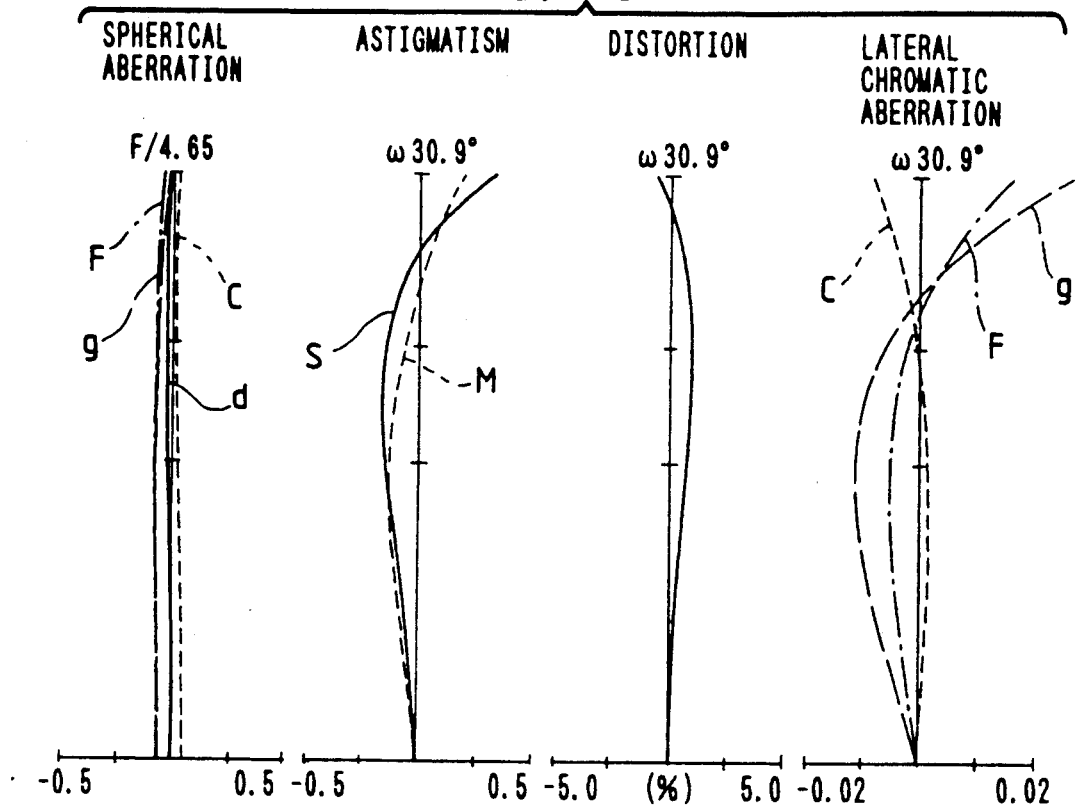
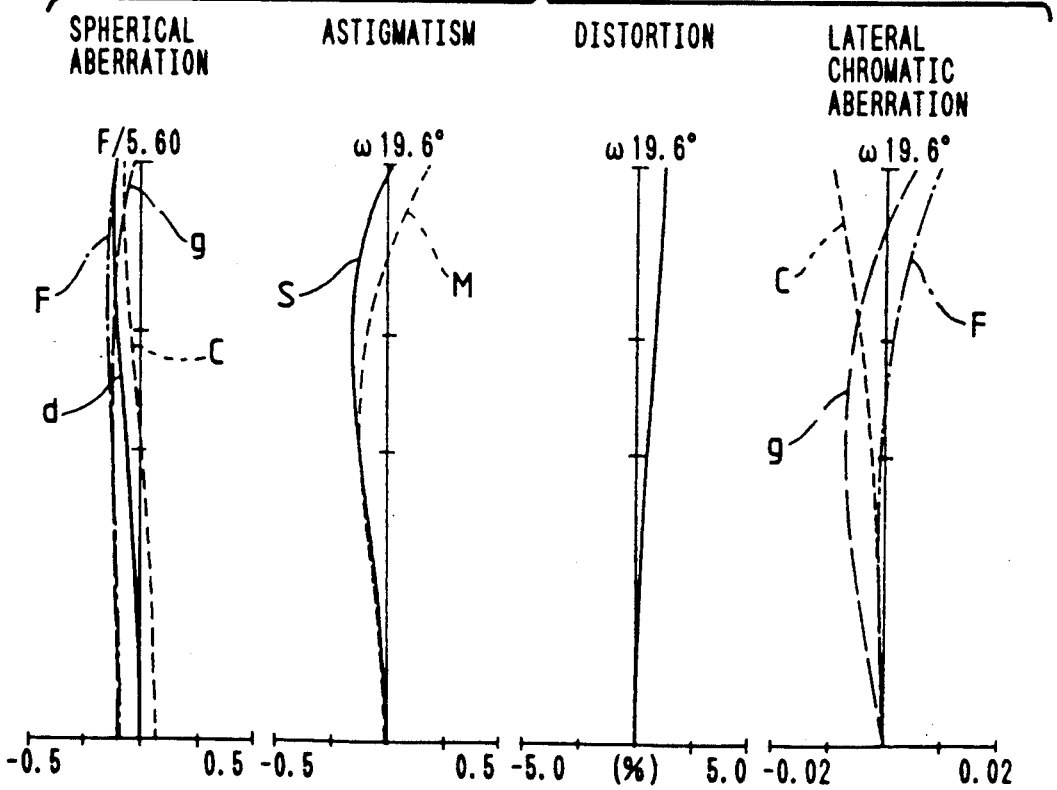

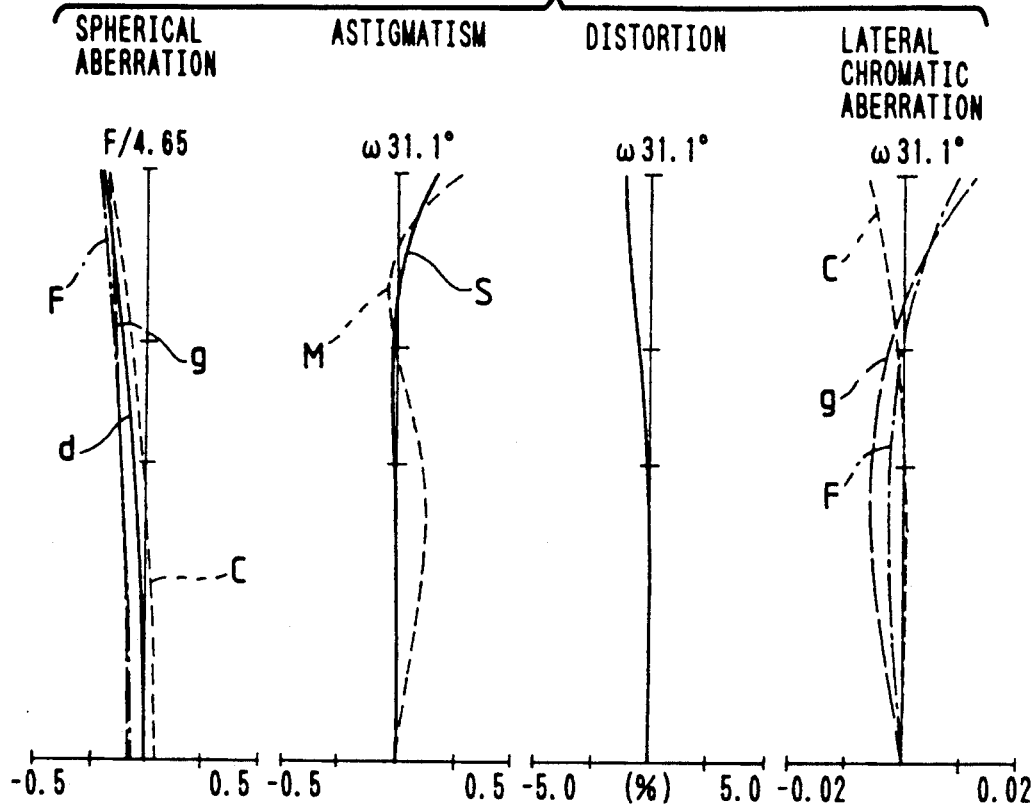
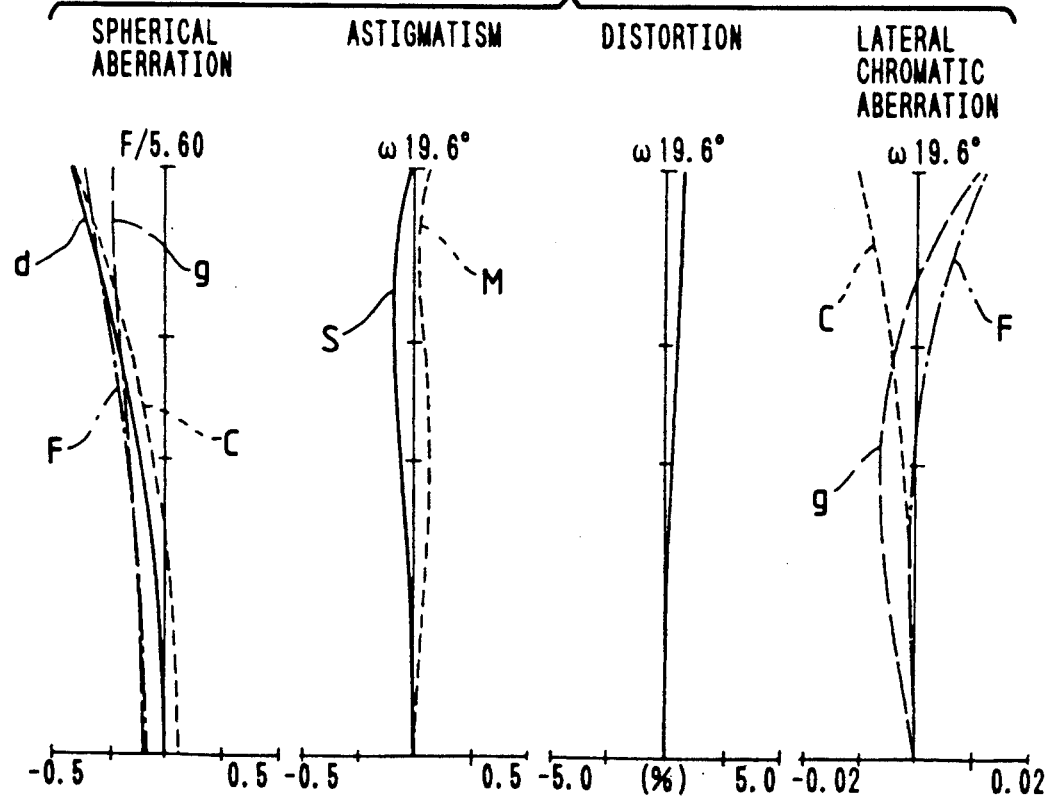

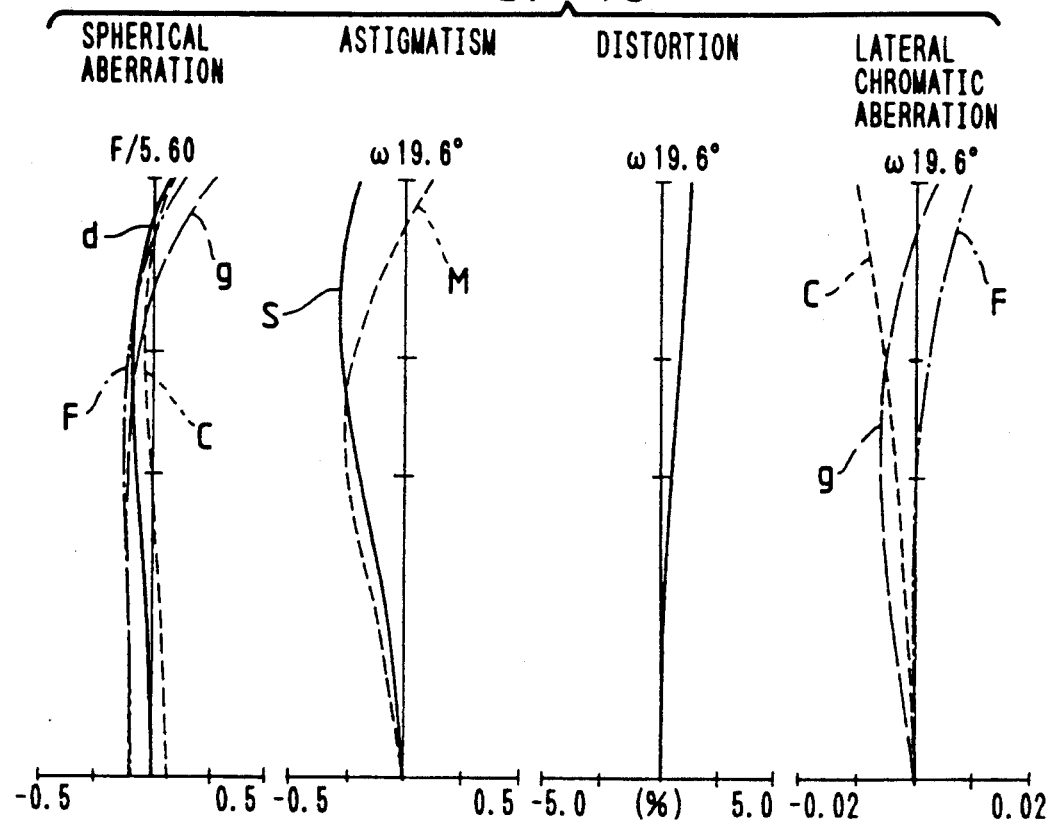
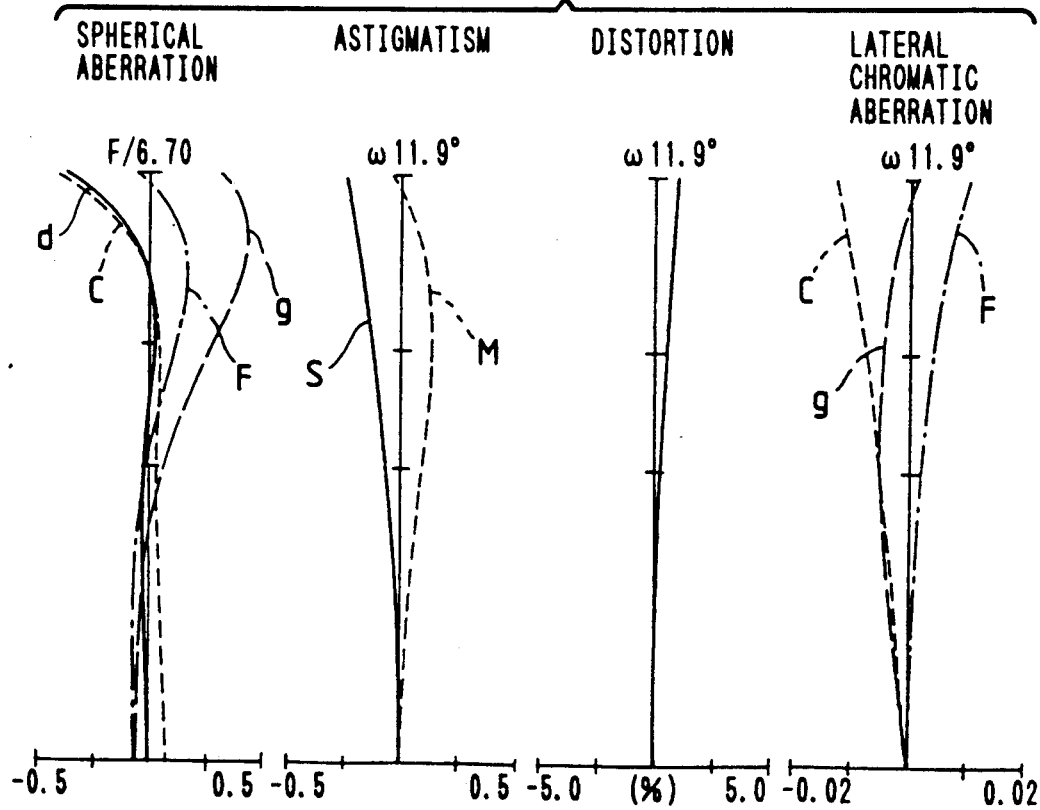

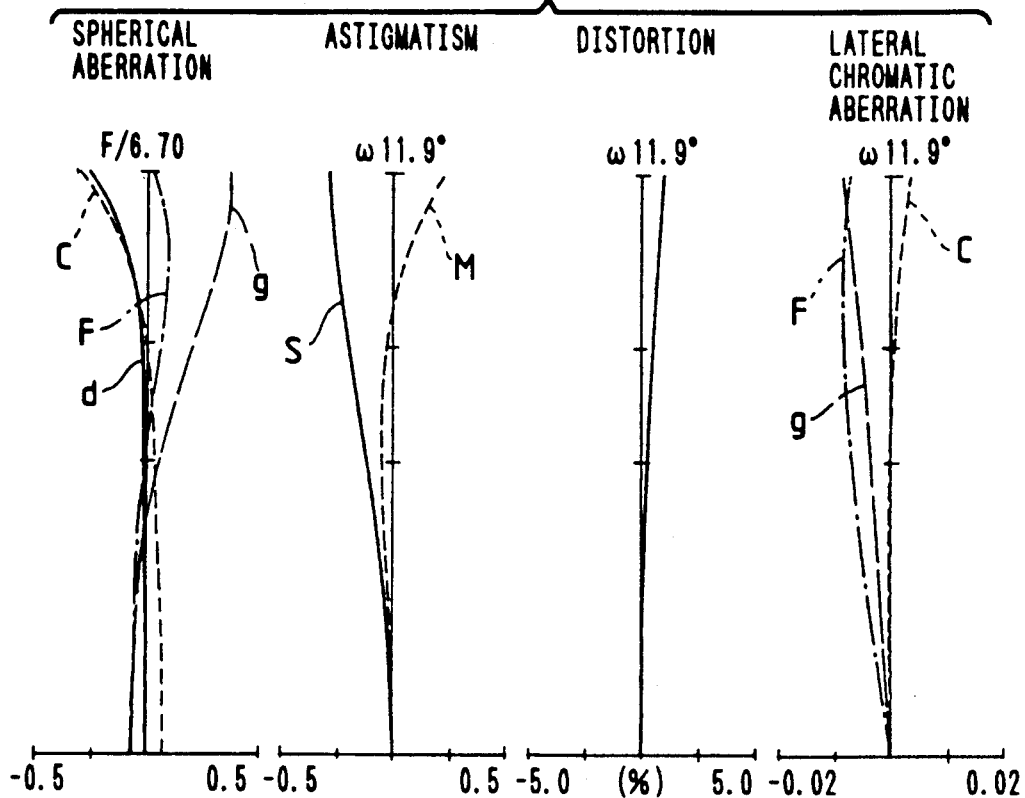
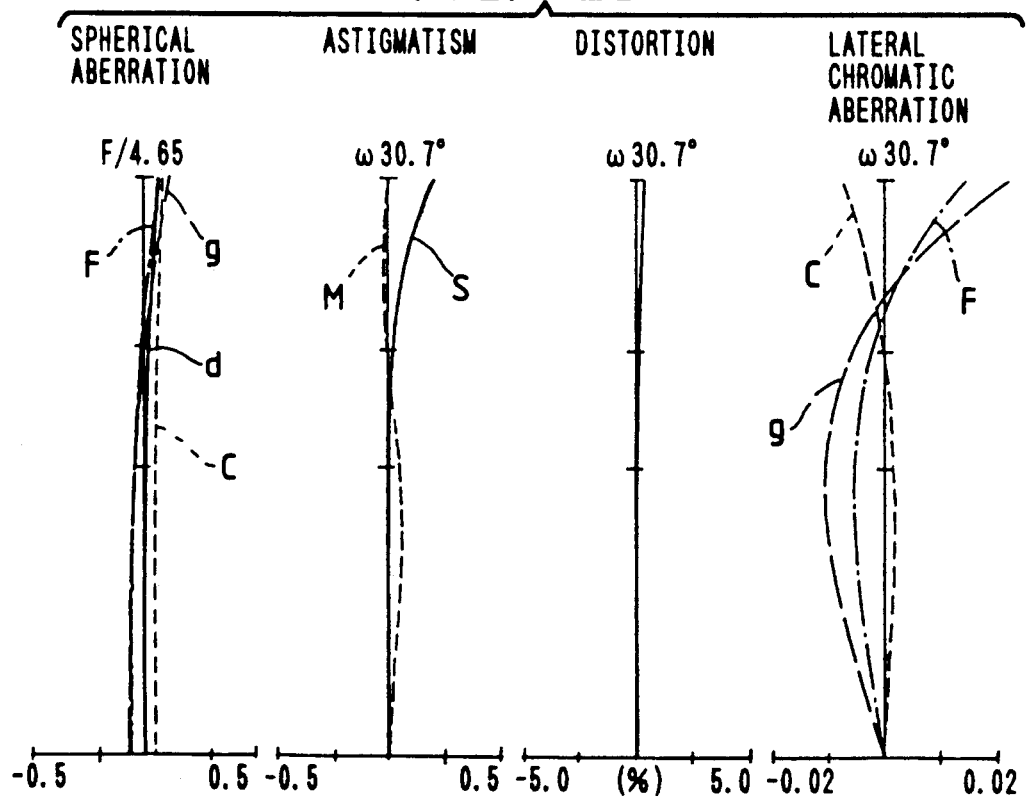

VARI-FOCAL LENS SYSTEM

BACKGROUND OF THE INVENTION

1. Field of the Invention:

The present invention relates to a compact vari-focal lens system which has a high vari-focal ratio and is to be used with lens shutter cameras.

2. Description of the prior art:

In the recent years, various attempts have been made to design compact and light-weight zoom lens system along with the market trend of compact cameras. Especially in the field of the lens shutter cameras which do not permit exchange of lens systems, it is strongly demanded to develop a camera equipped with a compact zoom lens system having a vari-focal ratio higher than 2.

Since it is unnecessary prolong a back focal length for the zoom lens system for lens shutter cameras which do not permit exchange of lens systems, it is possible to shorten the total length of the zoom lens system by arranging a lens unit having a strongly negative power at the rearmost location. As the conventional examples of such a zoom lens system, there are known the zoom lens system disclosed by Japanese Patent Kokai Publication No. Sho 62-264019 which consists of two lens units, the zoom lens system disclosed by Japanese Patent Kokai Publication No. Sho 63-153511 which consists of three lens units and the zoom lens system disclosed by Japanese Patent Kokai Publication No. Sho 64-88512 which consists of four lens units. Out of these conventional examples, the zoom lens system which consists of two lens units has a low vari-focal ratio on the order of 2, whereas the zoom lens systems which consists of three and four lens units respectively have a telephoto ratio higher than 1.6 at the wide positions thereof and are not sufficiently satisfactory in the compactness thereof.

In order to design a compact lens system, it is generally sufficient to strengthen powers of lenses by shortening radii of curvature on the lens surfaces. When the powers of the lenses are strengthened, however, the aberrations produced by the lens surfaces are aggravated and the number of the lenses must be increased, thereby making it impossible to design the lens system of interest compact in external design and light in weight.

It is necessary for a zoom lens system to correct chromatic aberration independently in each lens unit thereof. Accordingly, it is general to compose each lens unit so as to comprise at least one positive lens element and at least one negative lens element. Since the lens elements have powers reverse to each other in this case, it is obliged to strengthen the power of each lens element in order to impart the required power to the lens unit. As a result, aberrations are aggravated, thereby making it difficult to design a compact zoom lens system having a high vari-focal ratio.

SUMMARY OF THE INVENTION

A primary object of the present invention is to provide a compact vari-focal lens system which has a high vari-focal ratio on the order of 3, aberrations favorably corrected over the entire range from the wide position to the tele position thereof, and a very short total length.

The zoom lens system according to the present invention consists of a plurality of lens units including a rearmost lens unit having a negative power, and is designed so as to perform variation of focal length by varying the airspace(s) reserved between the lens units, said negative lens unit consisting, in the order from the object side, of a front subunit whose power is not so strong as a whole and a rear subunit which is arranged with an airspace reserved from said front subunit, consists of one or more negative lens elements and has a strongly negative power as a whole. Said front subunit consists of at least one positive lens element and at least one negative lens element, and at least one of the surfaces of said negative lens unit is designed as an aspherical surface having a negative refractive power which is weakened from the optical axis toward the marginal portion thereof.

Further, the zoom lens system according to the present invention is designed so as to satisfy the following conditions (1), (2) and (3):

$$-8 < \phi_N/\phi_T < -3 \quad (1)$$

$$-0.2 < \phi_F/\phi_N < 0.5 \quad (2)$$

$$0.5 < \phi_B/\phi_N < 1.2 \quad (3)$$

wherein the reference symbol $\phi_N$ represents the power of said negative lens unit, the reference symbols $\phi_F$ and $\phi_B$ designate powers of said front subunit and said rear subunit respectively arranged in the negative lens unit, and the reference symbol $\phi_T$ denotes the power of the zoom lens system as a whole at the tele position thereof.

In order to accomplish the object of the present invention, the zoom lens system consists of a plurality of lens units including the rearmost lens unit having the negative power. In order to enhance the vari-focal ratio and shorten the total length of the zoom lens system having the composition described above, it is desirable that the negative lens unit has an imaging magnification within the range defined by the following condition:

$$1.2 < \beta_W < 1.6$$

This condition is adopted for satisfying the requirement for the back focal length and compactness of the zoom lens system according to the present invention.

Further, it is desirable that the imaging magnification of the negative lens unit at the tele position is within the range defined by the following condition:

$$2.4 < \beta_T < 5$$

This condition is necessary for satisfying the requirements of the high vari-focal ratio and compactness of the zoom lens system according to the present invention.

In order to obtain the imaging magnification defined above and shorten the total length of the zoom lens system, it is necessary to strengthen the power of the negative lens unit. The condition (1) has been adopted for defining the power of the negative lens unit.

If the lower limit of the condition (1) is exceeded, each of the lens elements arranged in the negative lens unit will have an increased power and produce aberrations which can hardly be corrected favorably even by using the aspherical surface.

In order to obtain the imaging magnification and the power distribution described above, the negative lens unit is composed, as illustrated in FIG. 29, of a front subunit which has not so strong a power and a rear subunit which has the strong negative power. By composing the negative lens unit as described above, it is possible to shift the principal point of this lens unit toward the image side and obtain a back focal length of a certain degree while maintaining a low imaging magnification thereof on the order of 1.2 to 1.6 at the wide position.

Since the rear subunit has the strong negative power in the negative lens unit having the composition described above, it is necessary that the negative lens element arranged in the rear subunit has a strongly concave surface on the object side and that an airspace of a certain width is reserved between the front subunit and the rear subunit. That is to say, the negative lens unit consists of the front subunit arranged on the object side of the airspace and the rear subunit arranged on the image side of the airspace.

When the front subunit of the negative subunit is composed of a single positive lens element and the rear subunit is composed of a single negative lens element, the positive lens element must have a strong positive power for correcting chromatic aberration and the negative lens element must have a strengthened power accordingly, thereby making it difficult to correct aberrations even by using the aspherical surface.

In the zoom lens system according to the present invention, the power of the negative lens unit is set nearly equal to the negative power of the rear subunit and the power of the front subunit is weakened for correcting the chromatic aberration chiefly by the front subunit. The conditions (2) and (3) are adopted for this purpose.

If the lower limit of the condition (2) is exceeded or the upper limit of the condition (3) is exceeded, the power of the rear subunit will be strengthened, thereby making it difficult to correct aberrations favorably and the influence due to eccentricity of the lens elements will undesirably be remarkable. Especially when the rear subunit is composed of a single negative lens element, this lens element will be a biconcave lens element having high curvature on both the sides and produce the offaxial aberrations remarkably.

If the upper limit of the condition (2) or the lower limit of the condition (3) is exceeded, in contrast, the front subunit will have a strengthened power, thereby undesirably shortening the back focal length of the zoom lens system at the wide position thereof.

When both the conditions (2) and (3) are satisfied, it is possible to weaken the power of the rearmost surface of the rear subunit even in the case where it is composed of a single negative lens element, thereby reducing production of the offaxial aberrations.

When the power of the negative lens unit is strengthened to the degree defined by the condition (1), the offaxial aberrations at the wide position and chromatic aberration at the tele position are aggravated. These aberrations can be corrected by designing at least one surface of the negative lens unit as an aspherical surface whose negative refractive power is weakened from the optical axis toward the marginal portion thereof. It will be impossible to correct the aberrations favorably without using this aspherical surface.

When the intersection between the lens center and the optical axis is taken as the origin, the direction along the optical axis is taken as the x axis and the direction perpendicular to the optical axis is taken as the y axis, the shape of the aspherical surface is expressed by the following formula:

$$x = \frac{y^2/r}{1 + \sqrt{1 - p(y/r)^2}} + \sum_{i=2}^{n} A_{2i} y^{2i}$$

wherein the reference symbol r represents the radius of curvature on the reference sphere of said aspherical surface, the reference symbol p designates the conical constant and the reference symbol $A_{2i}$ denotes the aspherical surface coefficient.

When departure from the reference sphere is represented by $\Delta x$, the maximum image height is designated by h and the height of the principal ray on the aspherical surface corresponding to the maximum image height is denoted by $y_{EC}$, it is desirable to design the aspherical surface so as to satisfy the following condition (4):

$$10^{-3} < \Sigma(|\Delta x|/h) < 0.5 (y = y_{EC}) \tag{4}$$

If the lower limit of the condition (4) is exceeded, the offaxial aberrations, especially distortion, will be undercorrected. If the upper limit of the condition (4) is exceeded, in contrast, the offaxial aberrations will be overcorrected.

The departure from the reference sphere will be very large when only one aspherical surface is used for correcting the vari-focal lens system according to the present invention. In contrast, use of two or more aspherical surfaces will make it possible to share the aberration correcting function among the plural aspherical surfaces and reduce the departure from the reference sphere.

In the zoom lens system according to the present invention, the function to correct the chromatic aberration is imparted to the front subunit arranged in the negative lens unit as described above. In order to correct the chromatic aberration favorably, it is desirable that the positive lens element arranged in the front subunit has an Abbe's number satisfying the following condition (5):

$$\nu p < 50 \tag{5}$$

If the front subunit does not comprise at least one positive lens element satisfying the condition (5), the chromatic aberration, especially lateral chromatic aberration will undesirably be varied remarkably along with the variation of focal length.

Said negative lens unit requires three negative, positive and negative lens elements, or positive, negative and negative lens elements arranged in the order from the object side. The aberrations can be corrected more favorably by adding one or two lens elements to the three lens elements mentioned above. If three or more lens elements are added to the three lens elements mentioned above, however, the negative lens unit will occupy too large a space, thereby narrowing the space for the variation of focal length and hindering correction of the aberrations.

Description has been made above on the zoom lens system according to the present invention which comprises a plurality of lens units including the rearmost lens unit having a negative power.

In order to obtain a compacter zoom lens system having a high vari-focal ratio, however, it is desirable to adopt a first lens unit designed as a positive lens unit, and compose the zoom lens system of three positive, positive and negative lens units or four positive, negative, positive and negative lens units.

If the first lens unit is designed as a negative lens unit, the zoom lens system will has a long total length especially at the wide position thereof and cannot be compact. Further, the marginal ray will be high on the second and subsequent lens units, thereby making it difficult to correct the spherical aberration and making it impossible to design the vari-focal lens system so as to have a large aperture.

When the zoom lens system has the composition comprising the first lens unit designed as the positive lens unit, it is desirable for obtaining a high vari-focal ratio to select a composition wherein positive lens units and negative lens units are arranged alternately, i.e., to compose the zoom lens system according to the present invention of the four positive, negative, positive and negative lens units. As a modification of the zoom lens system composed of the four lens units, it is possible to integrate the second lens unit with the third lens unit into a single lens unit having a positive power, and compose the zoom lens system of three positive, positive and negative lens units.

When the zoom lens system according to the present invention is composed of the three positive, positive and negative lens units, or the four positive, negative, positive and negative lens units as described above, it is desirable that the power $\phi_p$ of the first positive lens unit satisfies the following condition (6):

$$1 < \phi_p/\phi_T < 3 \qquad (6)$$

If the lower limit of the condition (6) is exceeded, the power of the first positive lens unit will be weakened, thereby making it difficult to obtain a high vari-focal ratio. If the upper limit of the condition (6) is exceeded, in contrast, the power of the first positive lens unit will be strengthened, thereby making it difficult to correct the aberrations.

More preferably, the foremost surface and the rearmost surface of the rear subunit arranged in the rearmost lens unit having a negative power should be designed so as to be concentric with regard to a stop for suppressing production of the offaxial aberrations to low levels. When the rear subunit is composed of a single negative lens element, it is desirable to design the subunit as a meniscus lens element having surfaces both of which are concave on the object side.

Though the foregoing description has been made on the zoom lens system in which the image point is kept unchanged regardless of variation of focal length, the zoom lens system according to the present invention may be designed as the so-called vari-focal lens system in which the image point thereof is varied by variation of focal length. There are used in the recent years the so-called inner focus type zoom lens systems which are adapted so as to perform focusing by moving lenses other than the front lenses thereof. Since the image points are displaced along with variations of focal lengths in the inner focus type zoom lens systems, these lens systems can be regarded as the vari-focal lens systems in a narrow sense of the term. The present invention is applicable also to such vari-focal lens systems.

BRIEF DESCRIPTION OF THE DRAWINGS

FIG. 8 through FIG. 10 show graphs illustrating aberration characteristics of the Embodiment 1 of the present invention;

FIG. 14 through FIG. 16 show curves illustrating aberration characteristics of the Embodiment 3 of the present invention;

FIG. 17 through FIG. 19 show curves illustrating aberration characteristics of the Embodiment 4 of the present invention;

FIG. 20 through FIG. 22 show graphs illustrating aberration characteristics of the Embodiment 5 of the present invention;

FIG. 23 through FIG. 25 show graphs illustrating aberration characteristics of the Embodiment 6 of the present invention;

DETAILED DESCRIPTION OF THE PREFERRED EMBODIMENTS

Figure 1:
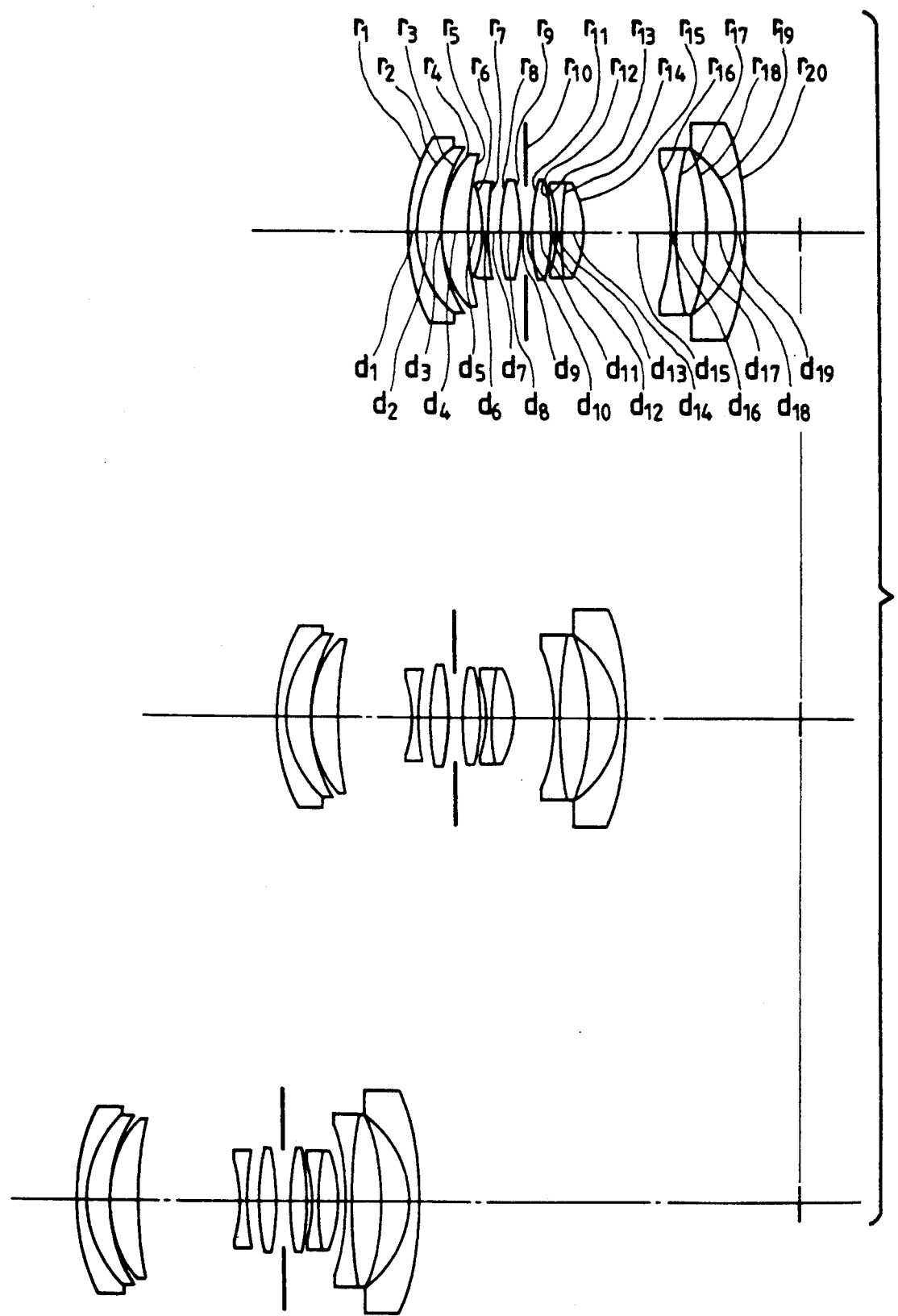
FIG. 1 through FIG. 7 show sectional views illustrating compositions of Embodiments 1 through 7 of the vari-focal lens system according to the present invention.

Now, the present invention will be described more detailedly below with reference to the preferred embodiments shown in the accompanying drawings and given in the form of the following numerical data:

Embodiment 1

$f = 36.2 \sim 101.3$, $F/4.65 \sim F/6.7$
maximum image height 21.6, $2\omega = 61.9° \sim 23.9°$

| | | | |
|---|---|---|---|
| $r_1 = 24.7412$ | | | |
| | $d_1 = 1.0000$ | $n_1 = 1.83400$ | $\nu_1 = 37.16$ |
| $r_2 = 13.0041$ | | | |
| | $d_2 = 3.2000$ | $n_2 = 1.65160$ | $\nu_2 = 58.52$ |
| $r_3 = 19.5652$ | | | |
| | $d_3 = 0.1500$ | | |
| $r_4 = 14.9720$ | | | |
| | $d_4 = 3.4000$ | $n_3 = 1.60311$ | $\nu_3 = 60.70$ |
| $r_5 = 51.5777$ | | | |
| | $d_5 = D_1$ (variable) | | |
| $r_6 = -18.7354$ | | | |
| | $d_6 = 0.8000$ | $n_4 = 1.77250$ | $\nu_4 = 49.66$ |
| $r_7 = 41.2491$ | | | |
| | $d_7 = 1.5268$ | | |
| $r_8 = 38.8962$ | | | |
| | $d_8 = 2.0000$ | $n_5 = 1.84666$ | $\nu_5 = 23.78$ |
| $r_9 = -42.4870$ | | | |
| | $d_9 = 1.0000$ | | |
| $r_{10} = \infty$ (stop) | | | |
| | $d_{10} = 1.0000$ | | |
| $r_{11} = 30.0121$ | | | |
| | $d_{11} = 2.2000$ | $n_6 = 1.60311$ | $\nu_6 = 60.70$ |
| $r_{12} = -23.5046$ | | | |
| | $d_{12} = 0.5958$ | | |
| $r_{13} = -18.2075$ | | | |
| | $d_{13} = 0.8000$ | $n_7 = 1.78472$ | $\nu_7 = 25.68$ |
| $r_{14} = 45.1166$ | | | |
| | $d_{14} = 2.4000$ | $n_8 = 1.60311$ | $\nu_8 = 60.70$ |
| $r_{15} = -14.2181$ (aspherical surface) | | | |
| | $d_{15} = D_2$ (variable) | | |
| $r_{16} = -25.4568$ (aspherical surface) | | | |

-continued

| | | | |
|---|---|---|---|
| $r_{17} = 91.1415$ | $d_{16} = 1.0000$ | $n_9 = 1.77250$ | $\nu_9 = 49.66$ |
| $r_{18} = -34.4207$ | $d_{17} = 3.2000$ | $n_{10} = 1.80518$ | $\nu_{10} = 25.43$ |
| $r_{19} = -12.4680$ | $d_{18} = 3.8000$ | | |
| $r_{20} = -36.8324$ | $d_{19} = 1.2000$ | $n_{11} = 1.77250$ | $\nu_{11} = 49.66$ | aspherical coefficient
(15th surface)
$P = -1.1019$, $A_4 = -0.13146 \times 10^{-4}$
$A_6 = 0.88522 \times 10^{-8}$
(16th surface)
$P = -7.8201$, $A_4 = -0.91236 \times 10^{-5}$
$A_6 = 0.33805 \times 10^{-6}$

| f | 36.2 | 60.5 | 101.3 |
|---|---|---|---|
| $D_1$ | 1.600 | 9.526 | 13.236 |
| $D_2$ | 11.166 | 5.226 | 1.000 | telephoto ratio at wide position  1.35
telephoto ratio at tele position  0.90

$\beta_W = 1.48$  $\beta_T = 3.45$
$\phi_N/\phi_T = -4.92$  $\phi_F/\phi_N = 0.10$
$\phi_B/\phi_N = 0.83$  $\Sigma(|\Delta x|/h) = 0.0113$
$\phi_P/\phi_T = 1.64$ Embodiment 2

$f = 36.2 \sim 101.3$, $F/4.65 \sim F/6.7$
maximum image height 21.6, $2\omega = 62.0° \sim 23.8°$

| | | | |
|---|---|---|---|
| $r_1 = 30.5186$ | $d_1 = 1.0000$ | $n_1 = 1.85026$ | $\nu_1 = 32.28$ |
| $r_2 = 15.8804$ | $d_2 = 0.2000$ | | |
| $r_3 = 15.6426$ | $d_3 = 3.0000$ | $n_2 = 1.65160$ | $\nu_2 = 58.52$ |
| $r_4 = 33.7688$ | $d_4 = 0.1500$ | | |
| $r_5 = 16.0462$ | $d_5 = 2.6000$ | $n_3 = 1.60311$ | $\nu_3 = 60.70$ |
| $r_6 = 29.9798$ | $d_6 = D_1$ (variable) | | |
| $r_7 = -14.6206$ | $d_7 = 0.8000$ | $n_4 = 1.77250$ | $\nu_4 = 49.66$ |
| $r_8 = 37.2143$ | $d_8 = 0.4000$ | | |
| $r_9 = 40.1418$ | $d_9 = 2.2000$ | $n_5 = 1.84666$ | $\nu_5 = 23.78$ |
| $r_{10} = -19.4293$ | $d_{10} = 1.0000$ | | |
| $r_{11} = \infty$ (stop) | $d_{11} = 1.0000$ | | |
| $r_{12} = 28.6091$ | $d_{12} = 2.2000$ | $n_6 = 1.60311$ | $\nu_6 = 60.70$ |
| $r_{13} = -38.1434$ | $d_{13} = 0.5500$ | | |
| $r_{14} = -17.2396$ | $d_{14} = 0.8000$ | $n_7 = 1.78472$ | $\nu_7 = 25.68$ |
| $r_{15} = 18.9517$ | $d_{15} = 2.8000$ | $n_8 = 1.60311$ | $\nu_8 = 60.70$ |
| $r_{16} = -11.9431$ (aspherical surface) | $d_{16} = D_2$ (variable) | | |
| $r_{17} = -20.3877$ | $d_{17} = 1.0000$ | $n_9 = 1.77250$ | $\nu_9 = 49.66$ |
| $r_{18} = -1114.6669$ | $d_{18} = 0.1500$ | | |
| $r_{19} = 212.9899$ | $d_{19} = 4.8000$ | $n_{10} = 1.80518$ | $\nu_{10} = 25.43$ |
| $r_{20} = -26.4438$ (aspherical surface) | $d_{20} = 2.7630$ | | |
| $r_{21} = -17.8873$ | $d_{21} = 1.2000$ | $n_{11} = 1.77250$ | $\nu_{11} = 49.66$ |
| $r_{22} = 1429.9313$ | | | | aspherical coefficient
(16th surface)
$P = -1.1531$, $A_4 = -0.82929 \times 10^{-4}$
$A_6 = 0.11896 \times 10^{-6}$
(20th surface)
$P = -0.5014$, $A_4 = -0.46970 \times 10^{-4}$
$A_6 = -0.27569 \times 10^{-7}$

| f | 36.2 | 60.5 | 101.3 |
|---|---|---|---|
| $D_1$ | 1.800 | 10.916 | 14.914 |
| $D_2$ | 11.106 | 5.105 | 0.800 | telephoto ratio at wide position  1.34
telephoto ratio at tele position  0.90

$\beta_W = 1.48$  $\beta_T = 3.42$
$\phi_N/\phi_T = -4.87$  $\phi_F/\phi_N = -0.01$
$\phi_B/\phi_N = 0.91$  $\Sigma(|\Delta x|/h) = 0.0209$
$\phi_P/\phi_T = 1.59$ Embodiment 3

$f = 36.2 \sim 101.3$, $F/4.65 \sim F/6.7$
maximum image height 21.6, $2\omega = 62.2° \sim 23.9°$

| | | | |
|---|---|---|---|
| $r_1 = 29.4871$ | $d_1 = 1.0000$ | $n_1 = 1.85026$ | $\nu_1 = 32.28$ |
| $r_2 = 16.7607$ | $d_2 = 3.0000$ | $n_2 = 1.65160$ | $\nu_2 = 58.52$ |
| $r_3 = 24.5303$ | $d_3 = 0.1500$ | | |
| $r_4 = 16.4144$ | $d_4 = 3.0000$ | $n_3 = 1.60311$ | $\nu_3 = 60.70$ |
| $r_5 = 46.8390$ | $d_5 = D_1$ (variable) | | |
| $r_6 = -16.6003$ | $d_6 = 0.8000$ | $n_4 = 1.77250$ | $\nu_4 = 49.66$ |
| $r_7 = 33.9165$ | $d_7 = 0.9389$ | | |
| $r_8 = 41.7858$ | $d_8 = 2.0000$ | $n_5 = 1.84666$ | $\nu_5 = 23.78$ |
| $r_9 = -26.1098$ | $d_9 = 1.0000$ | | |
| $r_{10} = \infty$ (stop) | $d_{10} = 1.0000$ | | |
| $r_{11} = 33.6148$ | $d_{11} = 2.2000$ | $n_6 = 1.60311$ | $\nu_6 = 60.70$ |
| $r_{12} = -28.8448$ | $d_{12} = 0.5231$ | | |
| $r_{13} = -17.6954$ | $d_{13} = 0.8000$ | $n_7 = 1.78472$ | $\nu_7 = 25.68$ |
| $r_{14} = 30.9694$ | $d_{14} = 2.8000$ | $n_8 = 1.60311$ | $\nu_8 = 60.70$ |
| $r_{15} = -12.1710$ (aspherical surface) | $d_{15} = D_2$ (variable) | | |
| $r_{16} = -67.6147$ | $d_{16} = 4.2000$ | $n_9 = 1.80518$ | $\nu_9 = 25.43$ |
| $r_{17} = -17.2596$ | $d_{17} = 1.0000$ | $n_{10} = 1.77250$ | $\nu_{10} = 49.66$ |
| $r_{18} = 139.7842$ | $d_{18} = 4.4000$ | | |
| $r_{19} = -16.1831$ (aspherical surface) | $d_{19} = 1.2000$ | $n_{11} = 1.77250$ | $\nu_{11} = 49.66$ |
| $r_{20} = -40.4614$ | | | | aspherical coefficient
(15th surface)
$P = -0.6526$, $A_4 = -0.33961 \times 10^{-4}$
$A_6 = -0.95783 \times 10^{-7}$
(19th surface)
$P = 1.0917$, $A_4 = 0.27982 \times 10^{-4}$
$A_6 = 0.15301 \times 10^{-6}$

| f | 36.2 | 60.5 | 101.3 |
|---|---|---|---|
| $D_1$ | 1.6000 | 9.263 | 13.351 |
| $D_2$ | 11.243 | 5.138 | 0.800 | telephoto ratio at wide position  1.37

-continued

| telephoto ratio at tele position | 0.93 |
|---|---|

$\beta_W = 1.47$  $\beta_T = 3.46$
$\phi_N/\phi_T = -4.70$  $\phi_F/\phi_N = 0.34$
$\phi_B/\phi_N = 0.60$  $\Sigma(|\Delta x|/h) = 0.0216$
$\phi_p/\phi_T = 1.55$

Embodiment 4

$f = 36.2 \sim 101.3$, $F/4.65 \sim F/6.7$
maximum image height 21.6, $2\omega = 61.9° \sim 23.8°$ $r_1 = 28.1772$
  $d_1 = 1.0000$  $n_1 = 1.85026$  $\nu_1 = 32.28$
$r_2 = 15.5712$
  $d_2 = 0.2000$
$r_3 = 15.1680$
  $d_3 = 3.0000$  $n_2 = 1.65160$  $\nu_2 = 58.52$
$r_4 = 29.9623$
  $d_4 = 0.1500$
$r_5 = 18.4297$
  $d_5 = 2.8000$  $n_3 = 1.60311$  $\nu_3 = 60.70$
$r_6 = 43.3409$
  $d_6 = D_1$ (variable)
$r_7 = -16.3694$
  $d_7 = 0.8000$  $n_4 = 1.77250$  $\nu_4 = 49.66$
$r_8 = 41.7129$
  $d_8 = 0.4000$
$r_9 = 59.2447$
  $d_9 = 2.0000$  $n_5 = 1.84666$  $\nu_5 = 23.78$
$r_{10} = -23.6035$
  $d_{10} = D_2$ (variable)
$r_{11} = \infty$ (stop)
  $d_{11} = 1.0000$
$r_{12} = 28.6304$
  $d_{12} = 2.2000$  $n_6 = 1.60311$  $\nu_6 = 60.70$
$r_{13} = -34.8042$
  $d_{13} = 0.500$
$r_{14} = -18.2820$
  $d_{14} = 0.8000$  $n_7 = 1.78472$  $\nu_7 = 25.68$
$r_{15} = 31.5315$
  $d_{15} = 2.8000$  $n_8 = 1.60311$  $\nu_8 = 60.70$
$r_{16} = -11.8690$ (aspherical surface)
  $d_{16} = D_3$ (variable)
$r_{17} = -17.9521$ (aspherical surface)
  $d_{17} = 1.0000$  $n_9 = 1.77250$  $\nu_9 = 49.66$
$r_{18} = 2431.4757$
  $d_{18} = 0.1500$
$r_{19} = 91.2176$
  $d_{19} = 3.4000$  $n_{10} = 1.80518$  $\nu_{10} = 25.43$
$r_{20} = -32.1803$
  $d_{20} = 4.2000$
$r_{21} = -12.2760$
  $d_{21} = 1.2000$  $n_{11} = 1.77250$  $\nu_{11} = 49.66$
$r_{22} = -34.1634$ aspherical coefficient
(16th surface)
$P = -0.9641$, $A_4 = -0.64429 \times 10^{-4}$
$A_6 = 0.25409 \times 10^{-6}$
(17th surface)
$P = -5.7912$, $A_4 = -0.63682 \times 10^{-4}$
$A_6 = -0.90433 \times 10^{-6}$

| f | 36.2 | 60.5 | 101.3 |
|---|---|---|---|
| $D_1$ | 1.600 | 9.227 | 14.087 |
| $D_2$ | 0.803 | 0.849 | 1.270 |
| $D_3$ | 10.433 | 4.882 | 0.800 |

| telephoto ratio at wide position | 1.31 |
|---|---|
| telephoto ratio at tele position | 0.88 |

$\beta_W = 1.53$  $\beta_T = 3.51$
$\phi_N/\phi_T = -5.17$  $\phi_F/\phi_N = 0.13$
$\phi_B/\phi_N = 0.77$  $\Sigma(|\Delta x|/h) = 0.0150$
$\phi_p/\phi_T = 1.71$

Embodiment 5

$f = 36.2 \sim 101.3$, $F/4.65 \sim F/6.7$
maximum image height 21.6, $2\omega = 62.0° \sim 23.8°$ $r_1 = 24.9075$
  $d_1 = 1.0000$  $n_1 = 1.83400$  $\nu_1 = 37.16$
$r_2 = 13.1805$
  $d_2 = 3.2000$  $n_2 = 1.65160$  $\nu_2 = 58.52$
$r_3 = 19.4700$
  $d_3 = 0.1500$
$r_4 = 15.0759$
  $d_4 = 3.4000$  $n_3 = 1.60311$  $\nu_3 = 60.70$
$r_5 = 54.0081$
  $d_5 = D_1$ (variable)
$r_6 = -18.6984$
  $d_6 = 0.8000$  $n_4 = 1.77250$  $\nu_4 = 49.66$
$r_7 = 39.6705$
  $d_7 = 1.4897$
$r_8 = 40.0788$
  $d_8 = 2.0000$  $n_5 = 1.84666$  $\nu_5 = 23.78$
$r_9 = -42.6066$
  $d_9 = 1.0000$
$r_{10} = \infty$ (stop)
  $d_{10} = 1.0000$
$r_{11} = 29.3745$
  $d_{11} = 2.4000$  $n_6 = 1.60311$  $\nu_6 = 60.70$
$r_{12} = -23.3151$
  $d_{12} = 0.5556$
$r_{13} = -18.2602$
  $d_{13} = 0.8000$  $n_7 = 1.78472$  $\nu_7 = 25.68$
$r_{14} = 48.9180$
  $d_{14} = 2.4000$  $n_8 = 1.60311$  $\nu_8 = 60.70$
$r_{15} = -14.1669$ (aspherical surface)
  $d_{15} = D_2$ (variable)
$r_{16} = -28.5254$ (aspherical surface)
  $d_{16} = 1.000$  $n_9 = 1.77250$  $\nu_9 = 49.66$
$r_{17} = 186.1573$
  $d_{17} = 3.2000$  $n_{10} = 1.80518$  $\nu_{10} = 25.43$
$r_{18} = -29.4093$
  $d_{18} = 2.2000$
$r_{19} = -14.9628$
  $d_{19} = 1.0000$  $n_{11} = 1.77250$  $\nu_{11} = 49.66$
$r_{20} = -20.8945$
  $d_{20} = 1.4000$
$r_{21} = -15.7447$
  $d_{21} = 1.0000$  $n_{12} = 1.77250$  $\nu_{12} = 49.66$
$r_{22} = -47.4969$ aspherical coefficient
(15th surface)
$P = -1.0755$, $A_4 = -0.13021 \times 10^{-4}$
$A_6 = -0.47845 \times 10^{-7}$
(16th surface)
$P = -9.9593$, $A_4 = -0.54791 \times 10^{-5}$
$A_6 = 0.23528 \times 10^{-6}$

| f | 36.2 | 60.5 | 101.3 |
|---|---|---|---|
| $D_1$ | 1.600 | 9.544 | 13.314 |
| $D_2$ | 11.100 | 5.089 | 0.800 |

| telephoto ratio at wide position | 1.37 |
|---|---|
| telephoto ratio at tele position | 0.91 |

$\beta_W = 1.48$  $\beta_T = 3.44$
$\phi_N/\phi_T = -4.85$  $\phi_F/\phi_N = -0.05$
$\phi_B/\phi_N = 0.99$  $\Sigma(|\Delta x|/h) = 0.010$
$\phi_p/\phi_T = 1.64$

Embodiment 6

$f = 36.2 \sim 101.3$, $F/4.65 \sim F/6.7$
maximum image height 21.6, $2\omega = 61.4° \sim 23.8°$ $r_1 = 31.5189$
  $d_1 = 1.0000$  $n_1 = 1.85026$  $\nu_1 = 32.28$
$r_2 = 17.3945$
  $d_2 = 3.0000$  $n_2 = 1.65160$  $\nu_2 = 58.52$ -continued

| | | | |
|---|---|---|---|
| $r_3 = 24.6805$ | | | |
| | $d_3 = 0.1500$ | | |
| $r_4 = 17.0385$ | | | |
| | $d_4 = 3.0000$ | $n_3 = 1.60311$ | $\nu_3 = 60.70$ |
| $r_5 = 52.1590$ | | | |
| | $d_5 = D_1$ (variable) | | |
| $r_6 = -16.4636$ | | | |
| | $d_6 = 0.8000$ | $n_4 = 1.77250$ | $\nu_4 = 49.66$ |
| $r_7 = 32.5713$ | | | |
| | $d_7 = 0.8724$ | | |
| $r_8 = 43.1827$ | | | |
| | $d_8 = 2.2000$ | $n_8 = 1.84666$ | $\nu_5 = 23.78$ |
| $r_9 = -25.3797$ | | | |
| | $d_9 = 1.0000$ | | |
| $r_{10} = \infty$ (stop) | | | |
| | $d_{10} = 1.0000$ | | |
| $r_{11} = 32.4446$ | | | |
| | $d_{11} = 2.4000$ | $n_6 = 1.60311$ | $\nu_6 = 60.70$ |
| $r_{12} = -27.7269$ | | | |
| | $d_{12} = 0.4699$ | | |
| $r_{13} = -17.7748$ | | | |
| | $d_{13} = 0.8000$ | $n_7 = 1.78472$ | $\nu_7 = 25.68$ |
| $r_{14} = 31.4495$ | | | |
| | $d_{14} = 3.2000$ | $n_8 = 1.60311$ | $\nu_8 = 60.70$ |
| $r_{15} = -12.5572$ (aspherical surface) | | | |
| | $d_{15} = D_2$ (variable) | | |
| $r_{16} = -68.6352$ | | | |
| | $d_{16} = 4.2000$ | $n_9 = 1.80518$ | $\nu_9 = 25.43$ |
| $r_{17} = -18.5557$ | | | |
| | $d_{17} = 1.0000$ | $n_{10} = 1.77250$ | $\nu_{10} = 49.66$ |
| $r_{18} = -34.4687$ | | | |
| | $d_{18} = 0.2000$ | | |
| $r_{19} = -66.0655$ | | | |
| | $d_{19} = 1.0000$ | $n_{10} = 1.77250$ | $\nu_{10} = 49.66$ |
| $r_{20} = 78.8914$ | | | |
| | $d_{20} = 4.6000$ | | |
| $r_{21} = -16.9865$ (aspherical surface) | | | |
| | $d_{21} = 1.2000$ | $n_{11} = 1.77250$ | $\nu_{11} = 49.66$ |
| $r_{22} = -79.2636$ (aspherical surface) | | | | aspherical coefficient
(15th surface)
$P = -0.6914$, $A_4 = -0.31449 \times 10^{-4}$
$A_6 = 0.13227 \times 10^{-6}$
(21st surface)
$P = 1.3581$, $A_4 = 0.30957 \times 10^{-4}$
$A_6 = 0.43586 \times 10^{-7}$
(22nd surface)
$P = 18.6572$, $A_4 = 0.61244 \times 10^{-6}$
$A_6 = -0.76275 \times 10^{-8}$

| f | 36.2 | 60.5 | 101.3 |
|---|---|---|---|
| $D_1$ | 1.800 | 9.824 | 13.293 |
| $D_2$ | 11.163 | 5.056 | 0.800 |
| telephoto ratio at wide position | | | 1.43 |
| telephoto ratio at tele position | | | 0.95 |

$\beta_W = 1.43$   $\beta_T = 3.43$
$\phi_N/\phi_T = -4.74$   $\phi_F/\phi_N = 0.19$
$\phi_B/\phi_N = 0.76$   $\Sigma(|\Delta x|/h) = 0.019$
$\phi_P/\phi_T = 1.40$

Embodiment 7

$f = 36.2 \sim 101.3$, $F/4.65 \sim F/6.7$
maximum image height 21.6, $2\omega = 61.7° \sim 23.8°$

| | | | |
|---|---|---|---|
| $r_1 = 24.0242$ | | | |
| | $d_1 = 1.0000$ | $n_1 = 1.83400$ | $\nu_1 = 37.16$ |
| $r_2 = 12.9247$ | | | |
| | $d_2 = 3.2000$ | $n_2 = 1.65160$ | $\nu_2 = 58.52$ |
| $r_3 = 19.8891$ | | | |
| | $d_3 = 0.1500$ | | |
| $r_4 = 14.8525$ | | | |
| | $d_4 = 3.4000$ | $n_3 = 1.60311$ | $\nu_3 = 60.70$ |
| $r_5 = 43.8371$ | | | |

-continued

| | | | |
|---|---|---|---|
| | $d_5 = D_1$ (variable) | | |
| $r_6 = -18.4385$ | | | |
| | $d_6 = 0.8000$ | $n_4 = 1.77250$ | $\nu_4 = 49.66$ |
| $r_7 = 40.2655$ | | | |
| | $d_7 = 1.4968$ | | |
| $r_8 = 37.0092$ | | | |
| | $d_8 = 2.0000$ | $n_5 = 1.84666$ | $\nu_5 = 23.78$ |
| $r_9 = -40.0129$ | | | |
| | $d_9 = 1.0000$ | | |
| $r_{10} = \infty$ (stop) | | | |
| | $d_{10} = 1.0000$ | | |
| $r_{11} = 32.0959$ | | | |
| | $d_{11} = 2.4000$ | $n_6 = 1.60311$ | $\nu_6 = 60.70$ |
| $r_{12} = -23.4848$ | | | |
| | $d_{12} = 0.5997$ | | |
| $r_{13} = -18.3541$ | | | |
| | $d_{13} = 0.8000$ | $n_7 = 1.78472$ | $\nu_7 = 25.68$ |
| $r_{14} = 39.2988$ | | | |
| | $d_{14} = 2.4000$ | $n_8 = 1.60311$ | $\nu_8 = 60.70$ |
| $r_{15} = -14.2198$ (aspherical surface) | | | |
| | $d_{15} = D_2$ (variable) | | |
| $r_{16} = -31.6191$ | | | |
| | $d_{16} = 1.0000$ | $n_9 = 1.77250$ | $\nu_9 = 49.66$ |
| $r_{17} = 90.7230$ | | | |
| | $d_{17} = 2.6000$ | $n_{10} = 1.80518$ | $\nu_{10} = 25.43$ |
| $r_{18} = -49.6815$ | | | |
| | $d_{18} = 0.2000$ | | |
| $r_{19} = -49.6815$ | | | |
| | $d_{19} = 2.8000$ | $n_{11} = 1.68893$ | $\nu_{11} = 31.08$ |
| $r_{20} = -28.3231$ (aspherical surface) | | | |
| | $d_{20} = 2.0000$ | | |
| $r_{21} = -14.7992$ | | | |
| | $d_{21} = 1.2000$ | $n_{12} = 1.77250$ | $\nu_{12} = 49.66$ |
| $r_{22} = -355.8696$ | | | | aspherical coefficient
(15th surface)
$P = -1.0048$, $A_4 = -0.16226 \times 10^{-4}$
$A_6 = 0.28923 \times 10^{-6}$, $A_8 = -0.60952 \times 10^{-8}$
(20th surface)
$P = 4.6353$, $A_4 = -0.23030 \times 10^{-4}$
$A_6 = -0.46389 \times 10^{-7}$, $A_8 = 0.57014 \times 10^{-9}$

| f | 36.2 | 60.5 | 101.3 |
|---|---|---|---|
| $D_1$ | 1.800 | 9.382 | 13.738 |
| $D_2$ | 11.129 | 5.135 | 0.800 |
| telephoto ratio at wide position | | | 1.38 |
| telephoto ratio at tele position | | | 0.90 |

$\beta_W = 1.45$   $\beta_T = 3.37$
$\phi_N/\phi_T = -4.96$   $\phi_F/\phi_N = -0.10$
$\phi_B/\phi_N = 1.02$   $\Sigma(|\Delta x|/h) = 0.025$
$\phi_P/\phi_T = 1.64$ wherein the reference symbols $r_1$, $r_2$, ... represents the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote refractive indices of the respective lens elements, and the reference symbols $\nu_1$, $\nu_2$, ... represent the Abbe's numbers of the respective lens elements The Embodiment 1 has the composition illustrated in FIG. 1 wherein the vari-focal lens system comprises three positive, positive and negative lens units which are moved for variation of focal length of the lens system. The third lens unit is designed as a negative lens unit which consists of a front subunit designed as a cemented doublet composed of a negative lens element and a positive lens element, and a rear subunit composed of a single negative lens element When the negative lens unit is to be composed of three lens elements, a negative-positive-negative power distribution is more advantageous than a positive-negative-negative power distribution since the former allows to lower curvature on the image side surface of the first lens element and that on the object side surface of the second lens element, and narrow the space to be occupied by the lens elements, thereby making it possible to reduce manufacturing cost and design the vari-focal lens system compacter. In the Embodiment 1 the first surface of the front subunit of the negative lens unit is designed as the aspherical surface.

Figure 10:
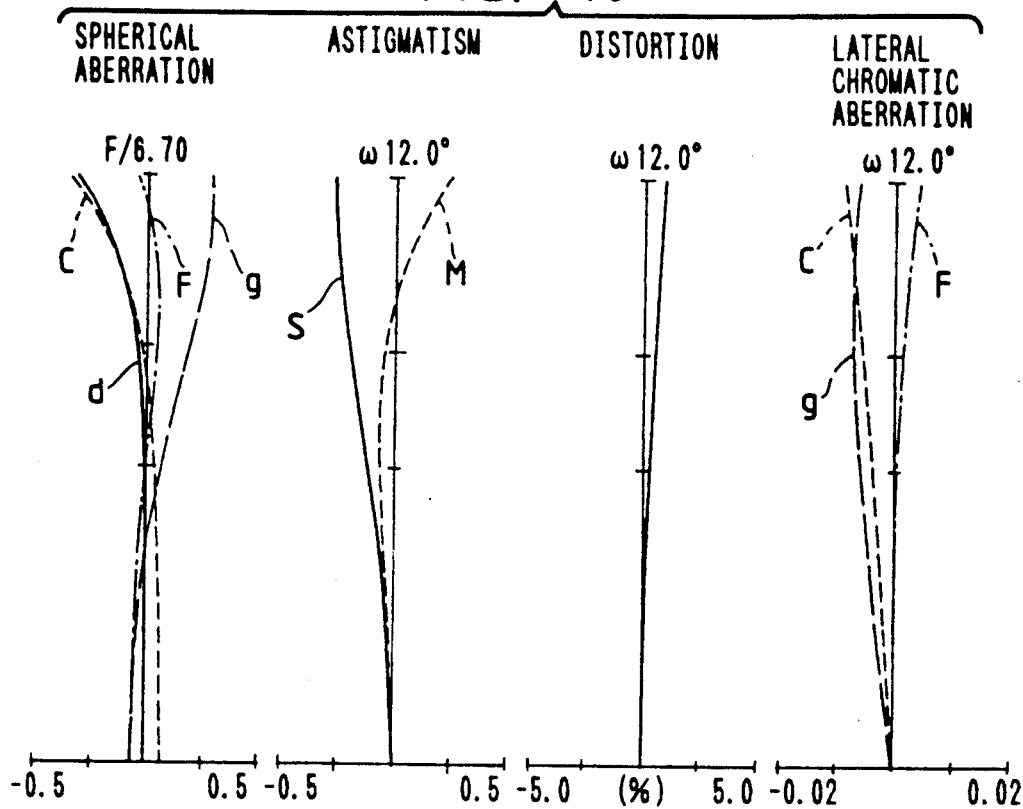

Aberration characteristics at the wide position, intermediate focal length and tele position of the Embodiment 1 are illustrated in FIG. 8, FIG. 9 and FIG. 10 respectively.

Figure 2:
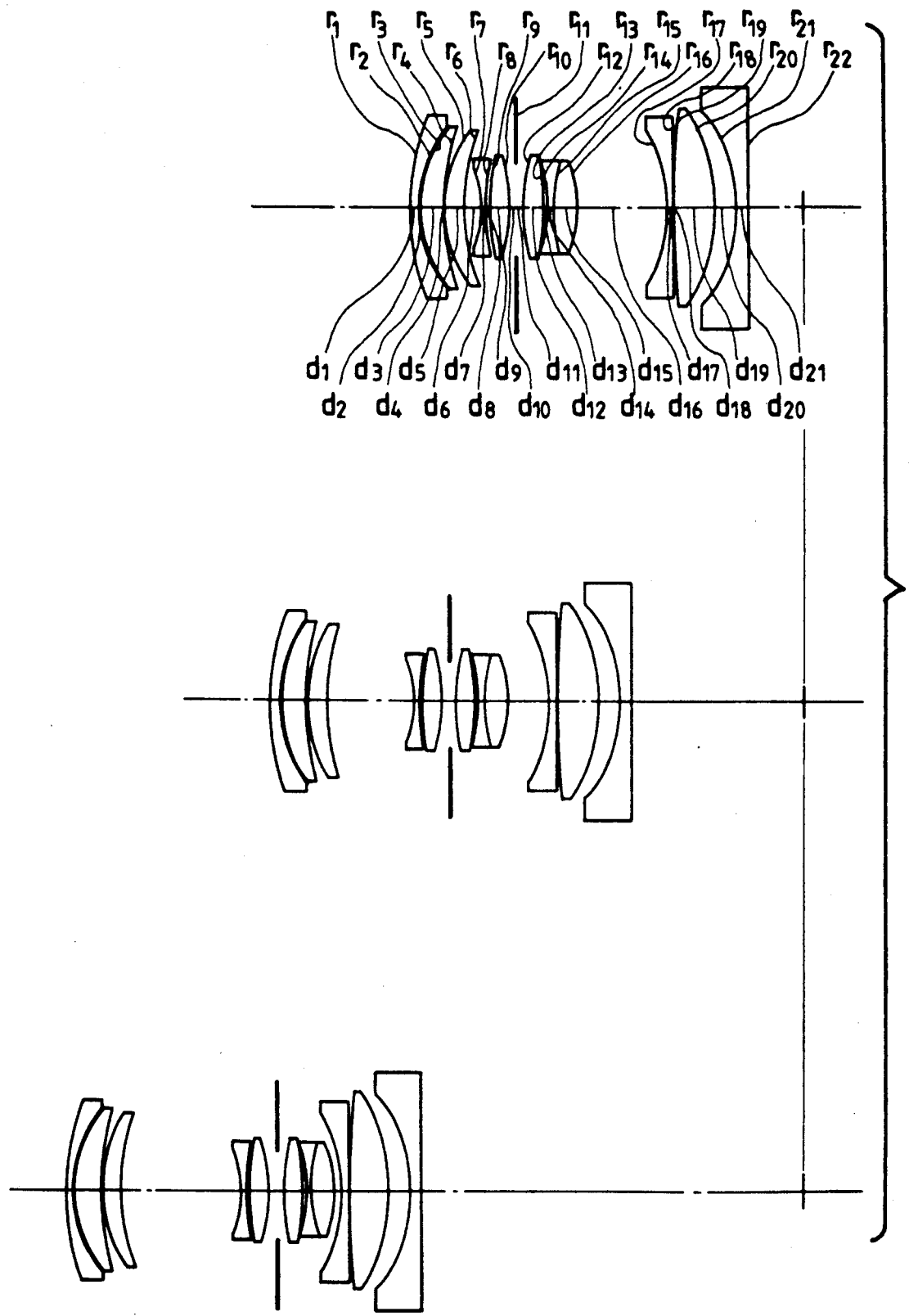

The Embodiment 2 has the composition illustrated in FIG. 2 wherein the vari-focal lens system comprises three positive, positive and negative lens units arranged in the order from the object side, and is adapted so as to perform variation of focal length by moving these lens units. The third lens unit is designed as the negative lens unit arranged at the rearmost location, and consists of a front subunit composed of a negative lens element and a positive lens element, and a rear subunit composed of a single negative lens element.

Figure 11:
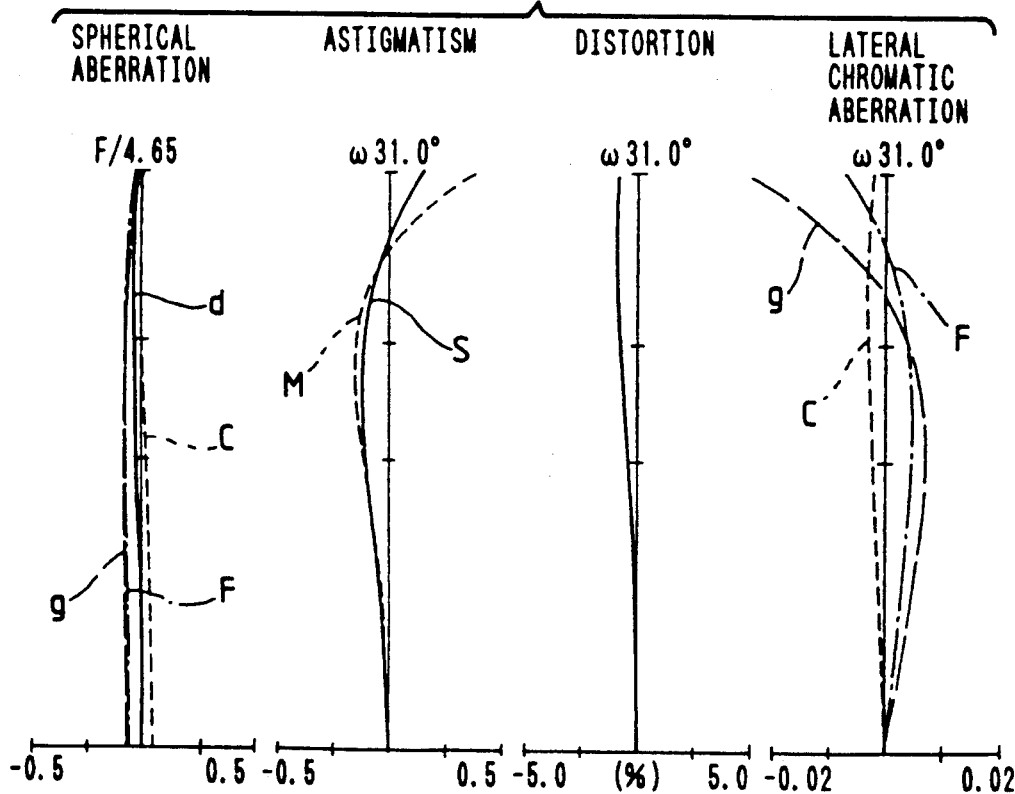
FIG. 11 through FIG. 13 show graphs illustrating aberration characteristics of the Embodiment 2 of the present invention.
Figure 12:
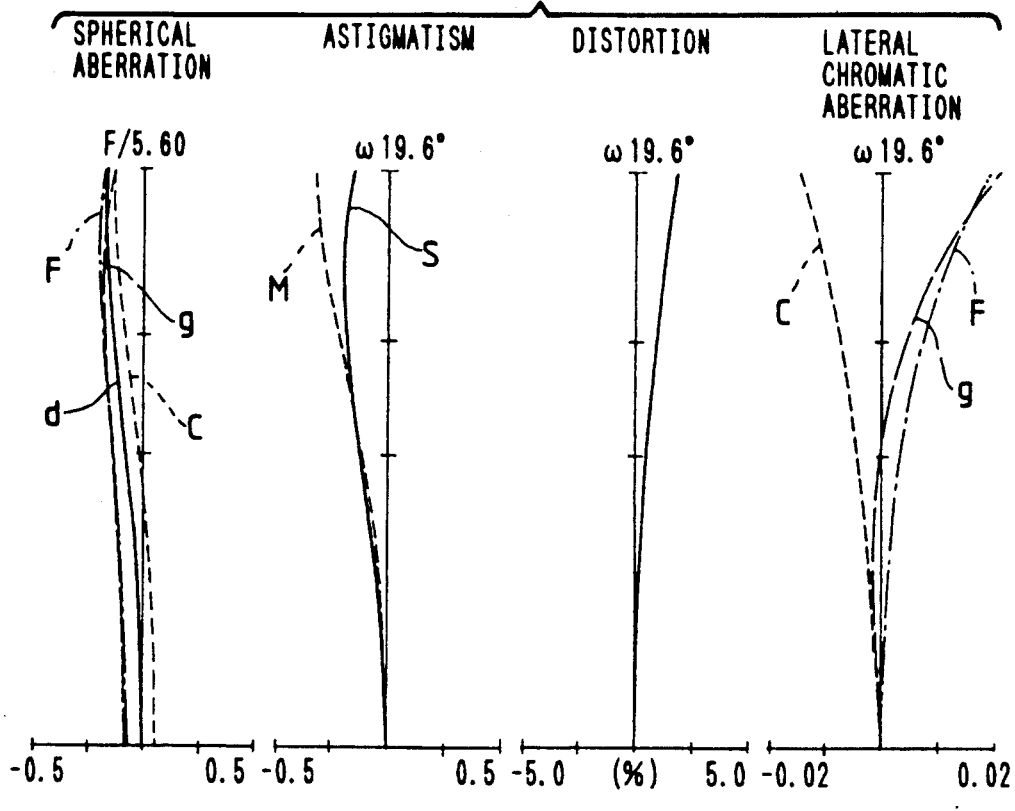
Figure 13:
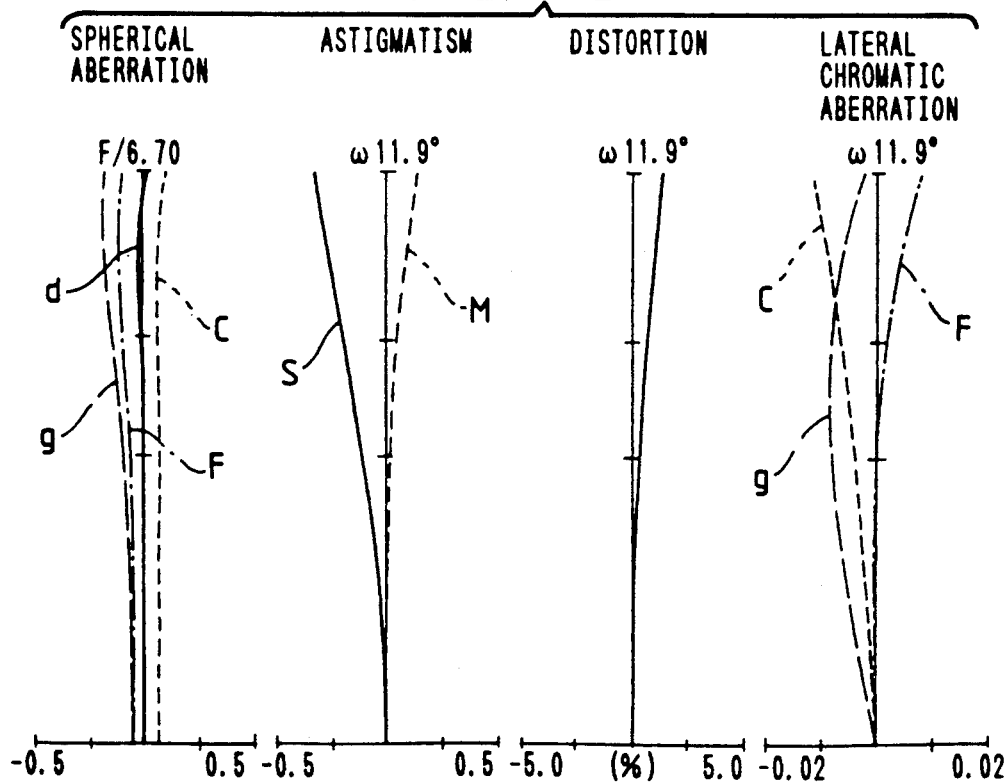

Aberration characteristics at the wide position, intermediate focal length and tele position of the Embodiment 2 are visualized in FIG. 11, FIG. 12 and FIG. 13 respectively.

Figure 3:
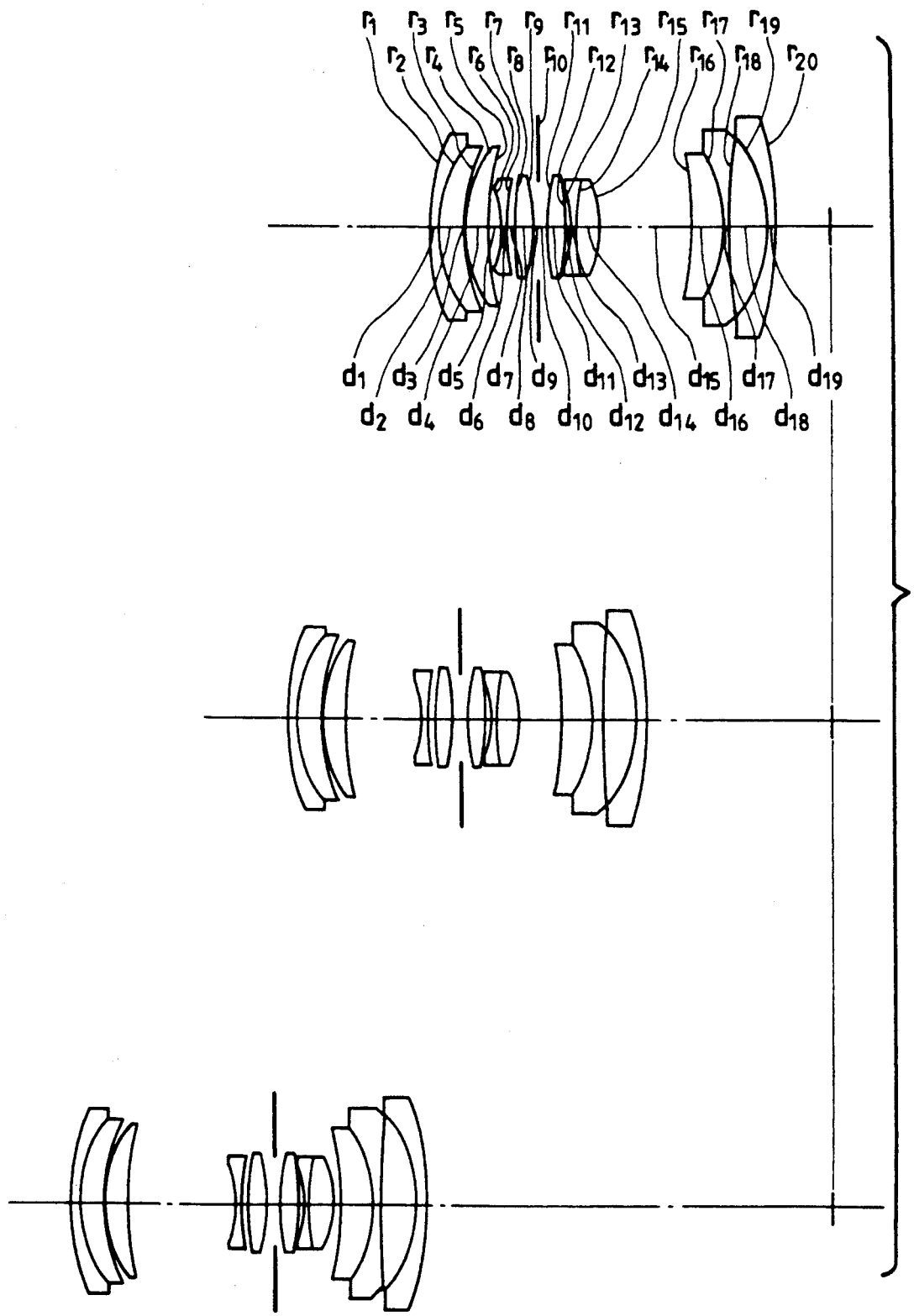

The Embodiment 3 has the composition illustrated in FIG. 3 wherein the vari-focal lens system comprises, in the order from the object side, a positive lens unit, another positive lens unit and a negative lens unit which consists of a front subunit designed as a cemented doublet composed of a positive lens element and a negative lens element, and a rear subunit composed of a single negative lens element.

When the negative lens unit is composed of the three positive, negative and negative lens elements, the image side surface of the positive lens element of the front subunit and the object side surface of the negative lens element thereof are concentric with regard to the stop, whereby the offaxial aberrations are hardly produced even if a difference in refractive index is large between the positive lens element and the negative lens element of the front subunit.

The Embodiment 3 uses the aspherical surface as the first surface of the rear subunit.

Figure 16:
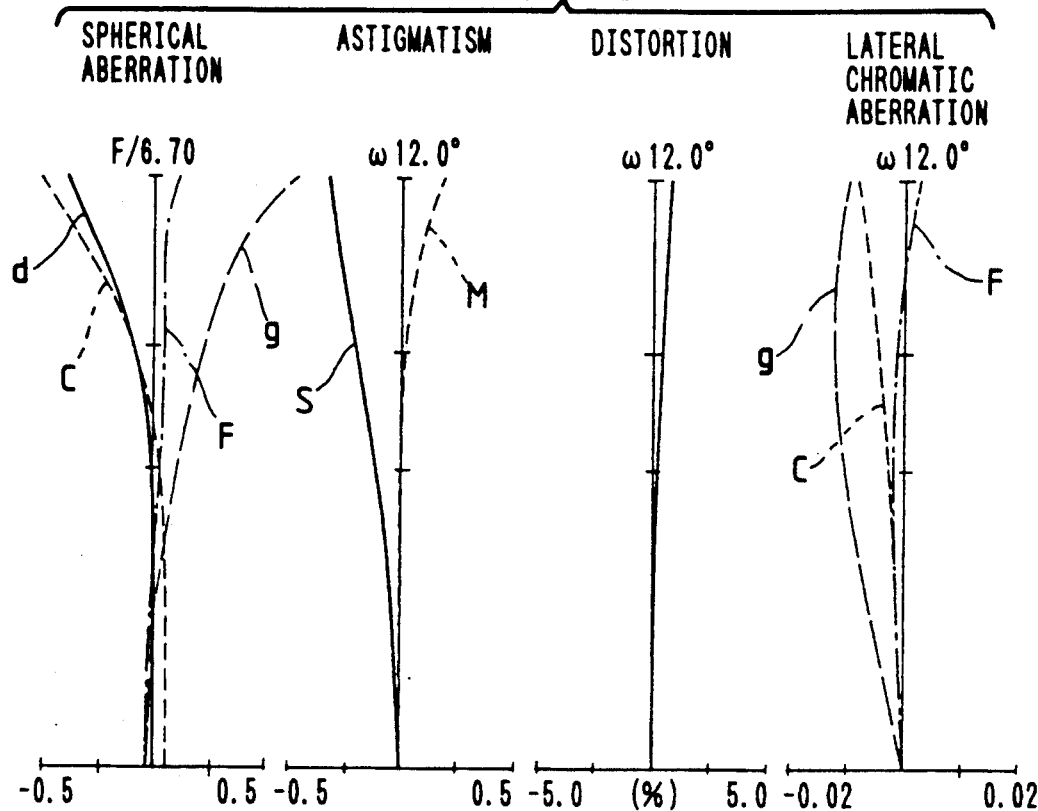

Aberration characteristics at the wide position, intermediate focal length and tele position of the Embodiment 3 are visualized in FIG. 14, FIG. 15 and FIG. 16 respectively.

Figure 4:
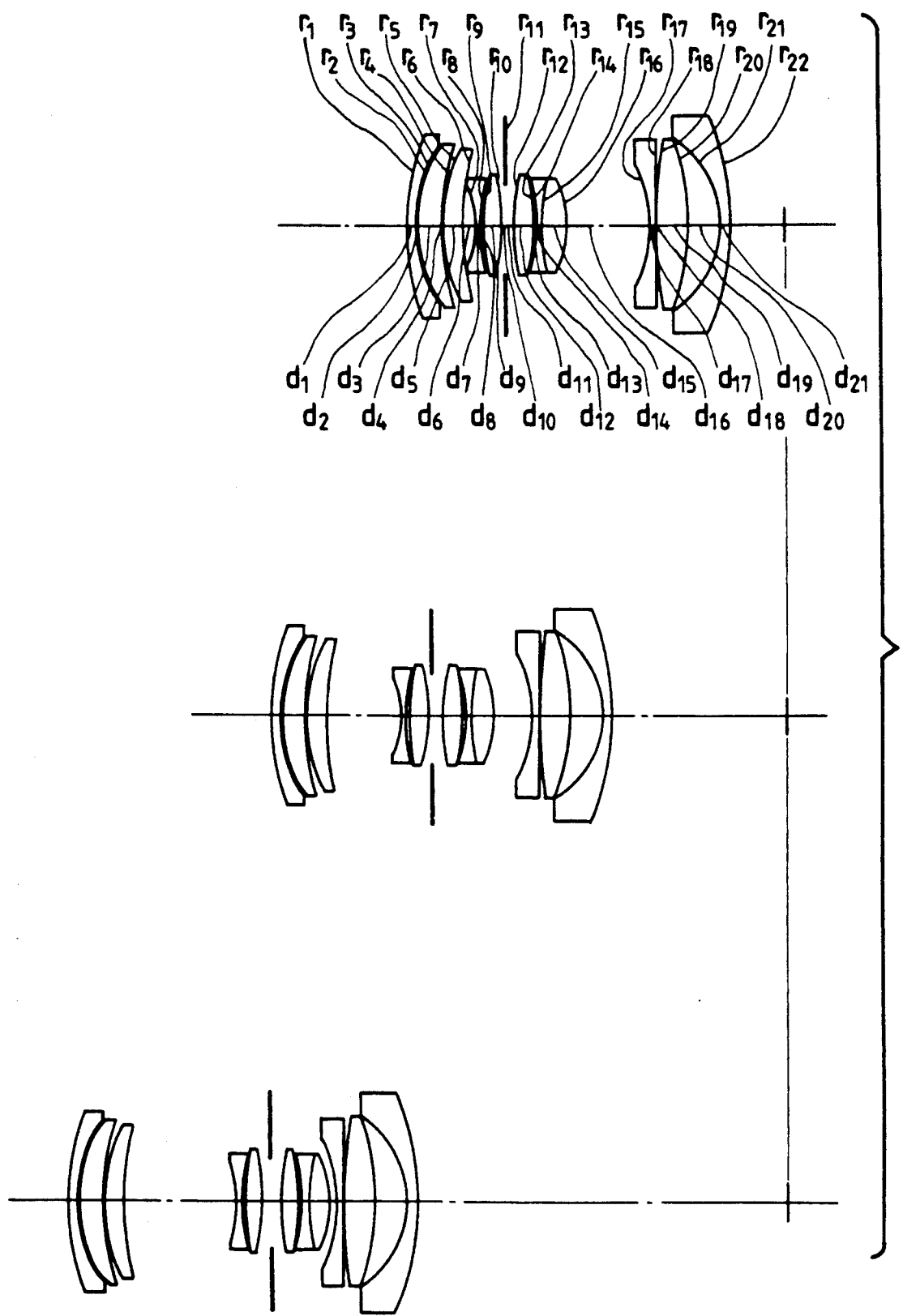

The Embodiment 4 has the composition shown in FIG. 4 wherein the vari-focal lens system is composed of four positive, negative, positive and negative lens units, and is adapted so as to perform variation of focal length by moving these lens units. The fourth lens unit is used as the negative lens unit arranged at the rearmost location. This fourth lens unit is composed of a front subunit consisting of a negative lens element and a positive lens element, and a rear subunit consisting of a single negative lens element. In the Embodiment 4, the first surface of the front subunit of the fourth lens unit is designed as the aspherical surface.

Figure 17:
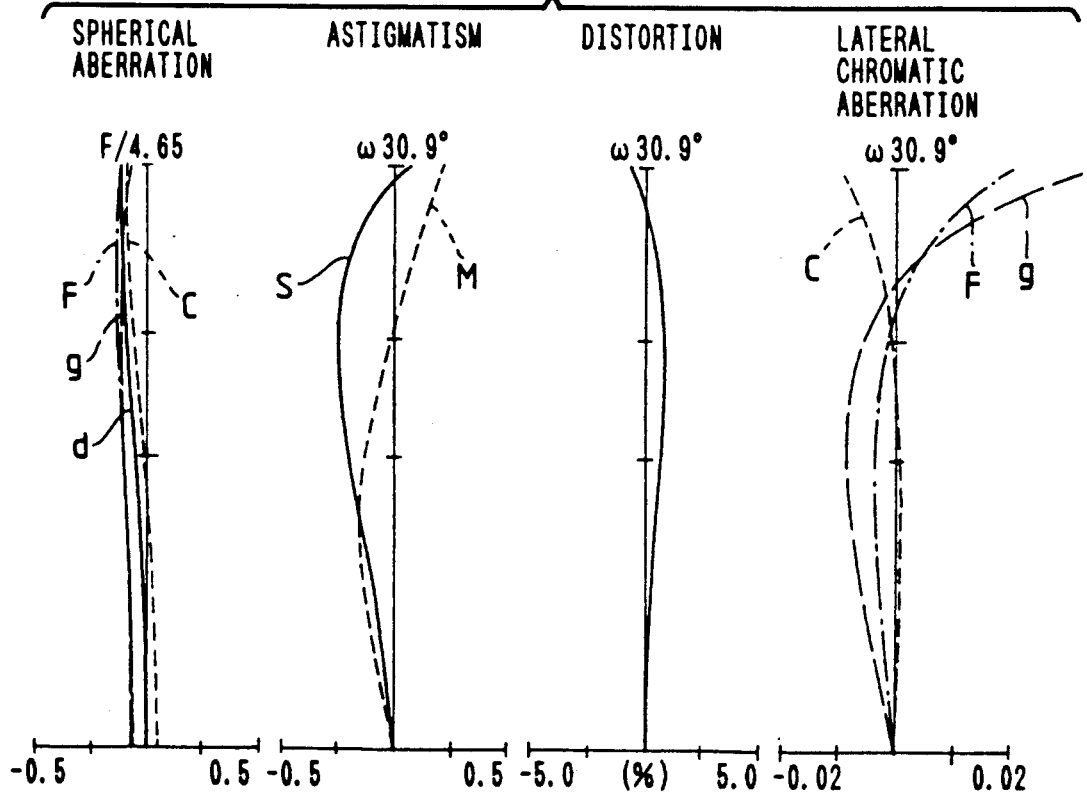

Aberration characteristics at the wide position, intermediate focal length and tele position of the Embodiment 4 are illustrated in FIG. 17, FIG. 18 and FIG. 19 respectively.

Figure 5:
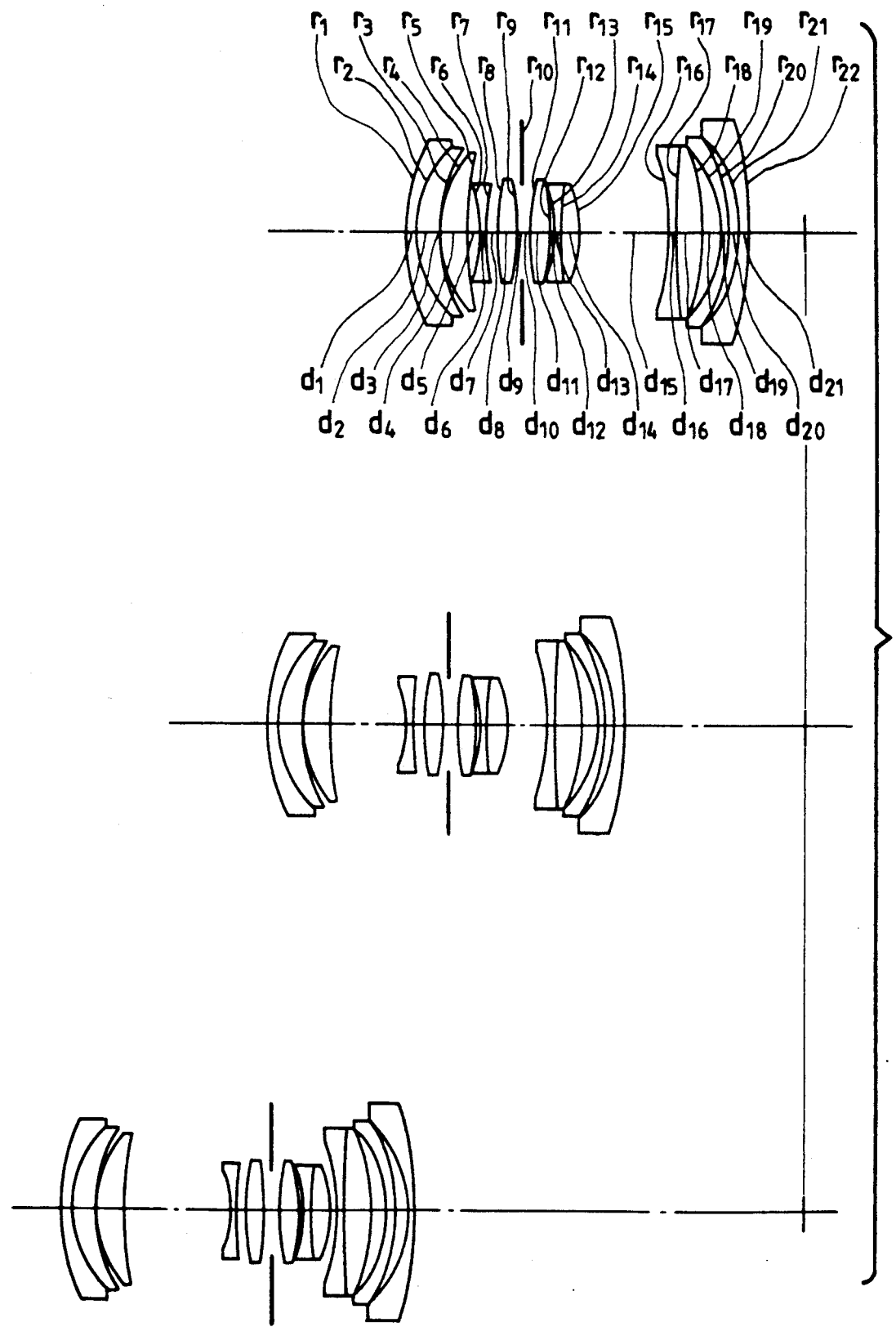

The Embodiment 5 has the composition shown in FIG. 5 wherein the vari-focal lens system comprises, in the order from the object side, three positive, positive and negative lens units, and is adapted so as to perform variation of focal length by moving these lens units. The third lens unit is adopted as the negative lens unit arranged at the rearmost location, and composed of a front subunit designed as a cemented doublet consisting of a negative lens element and a positive lens element, and a rear subunit consisting of two negative lens elements In addition, the first surface of the front subunit is designed as the aspherical surface.

Figure 20:
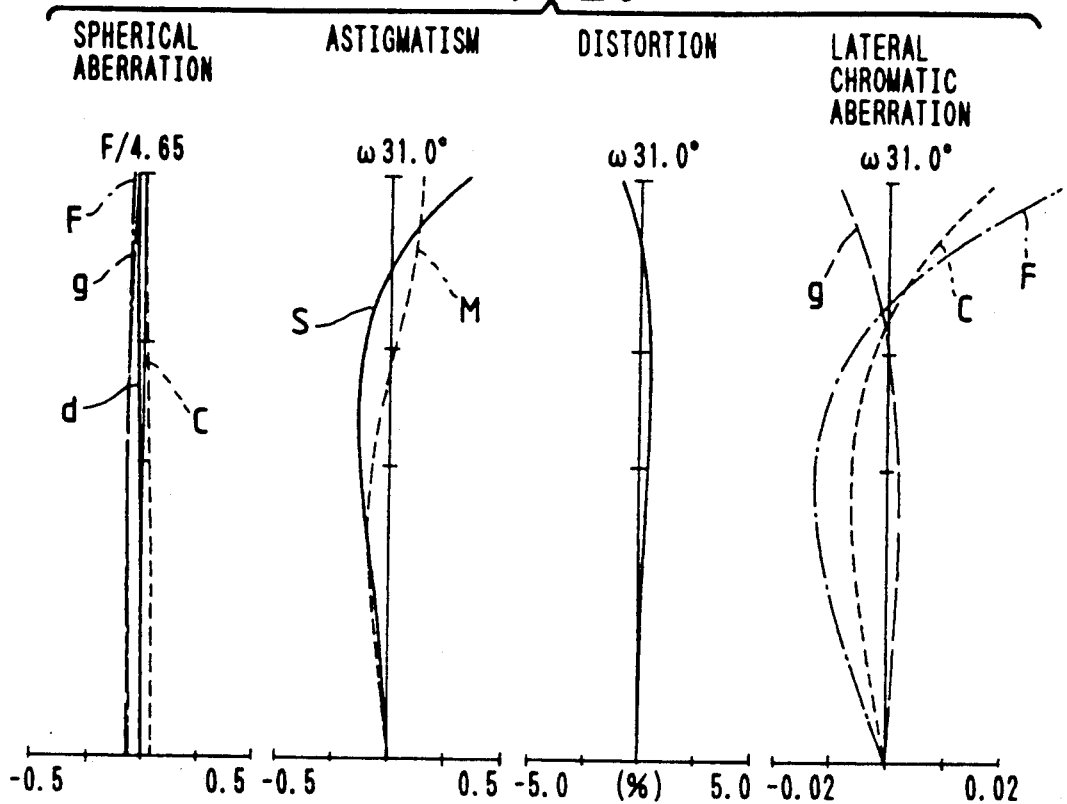
Figure 21:
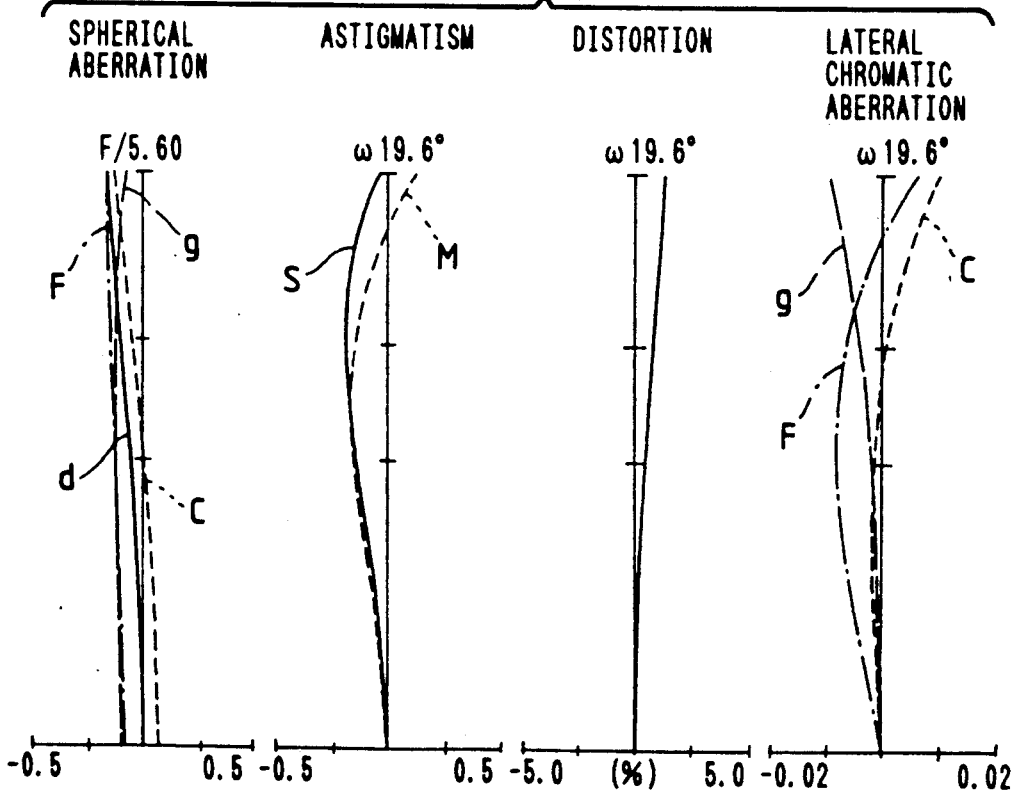

Aberration characteristics at the wide position, intermediate focal length and tele position of the Embodiment 5 are illustrated in FIG. 20, FIG. 21 and FIG. 22 respectively.

Figure 6:
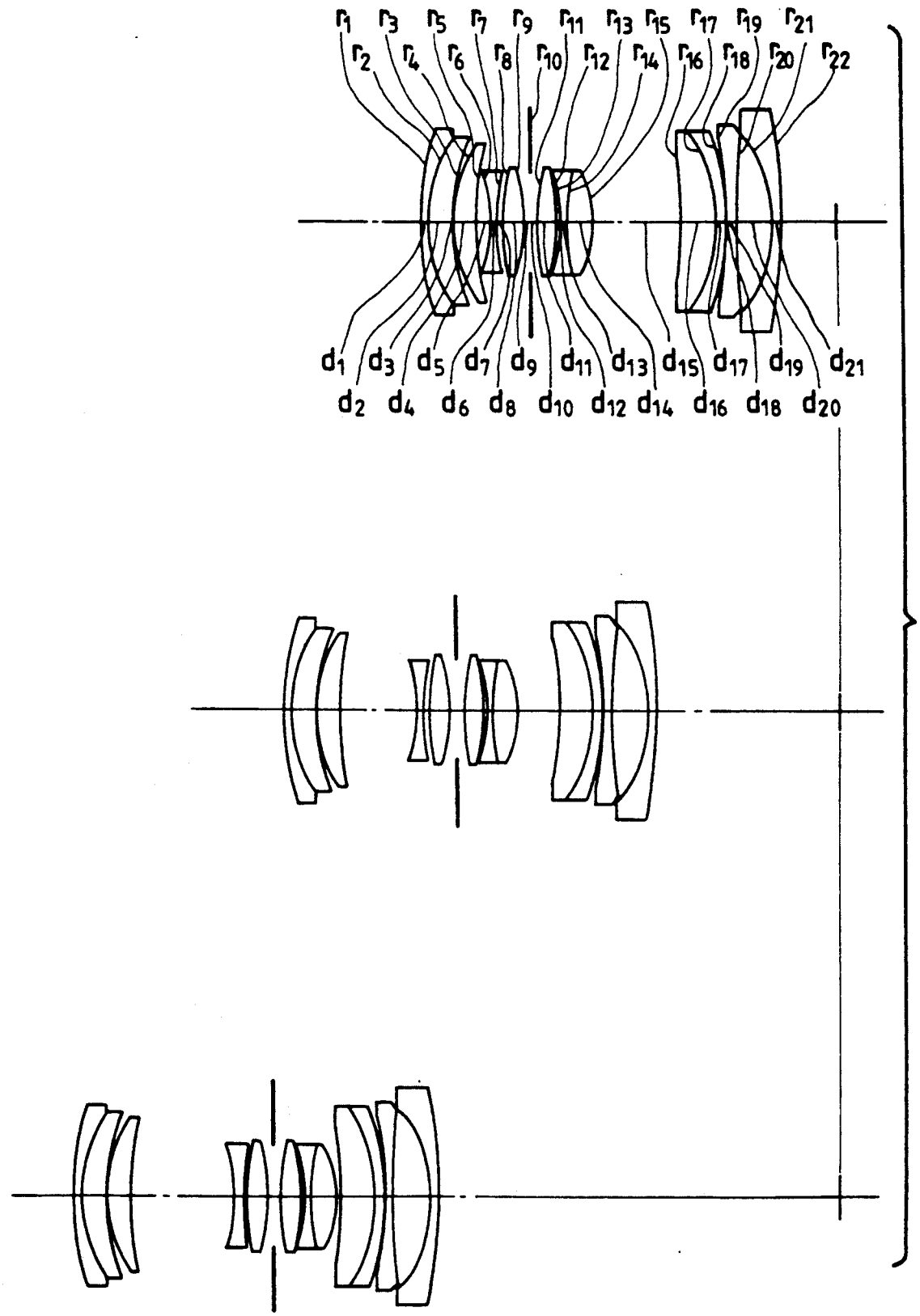

The Embodiment 6 has the composition shown in FIG. 6 wherein the vari-focal lens system comprises, in the order from the object side, three positive, positive and negative lens units, the third lens unit being the negative lens unit arranged at the rearmost location. The third lens unit is composed of a front subunit designed as a cemented doublet consisting of a positive lens element and a negative lens element, and a rear subunit consisting of a single negative lens element. The first surface and the third surface of the rear subunit are designed as the aspherical surfaces. Since the two aspherical surfaces are adopted in the Embodiment 6 as described above, both the aspherical surfaces have little departures from the reference spheres thereof.

Figure 24:
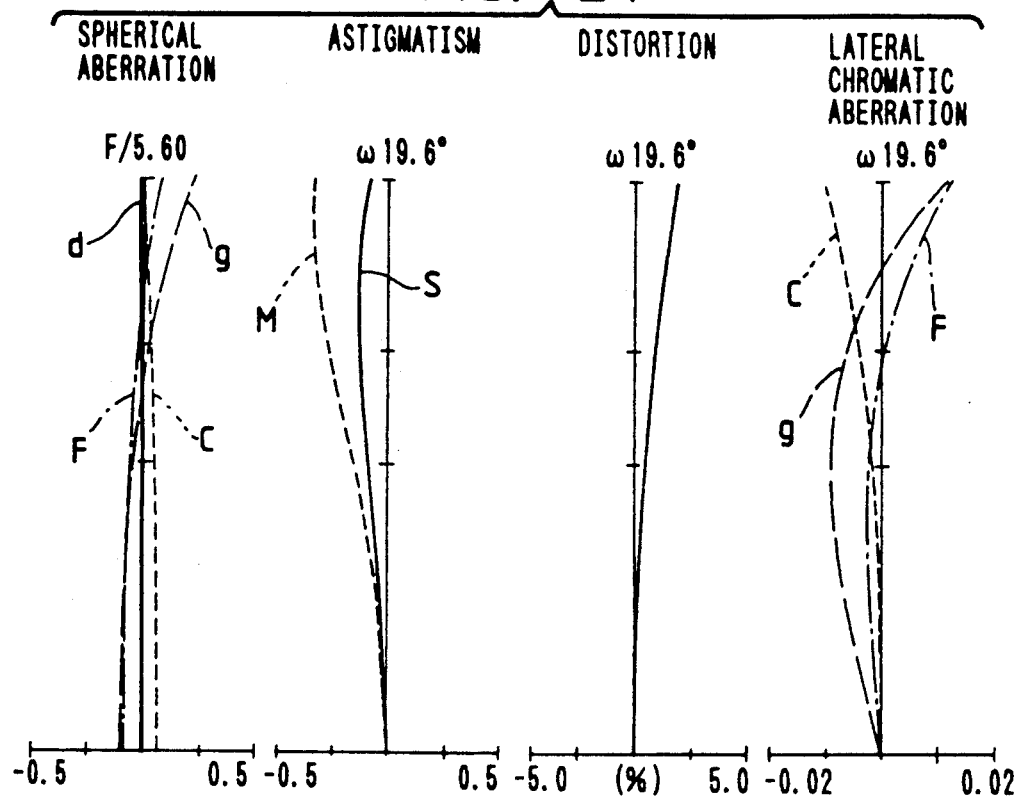
Figure 25:
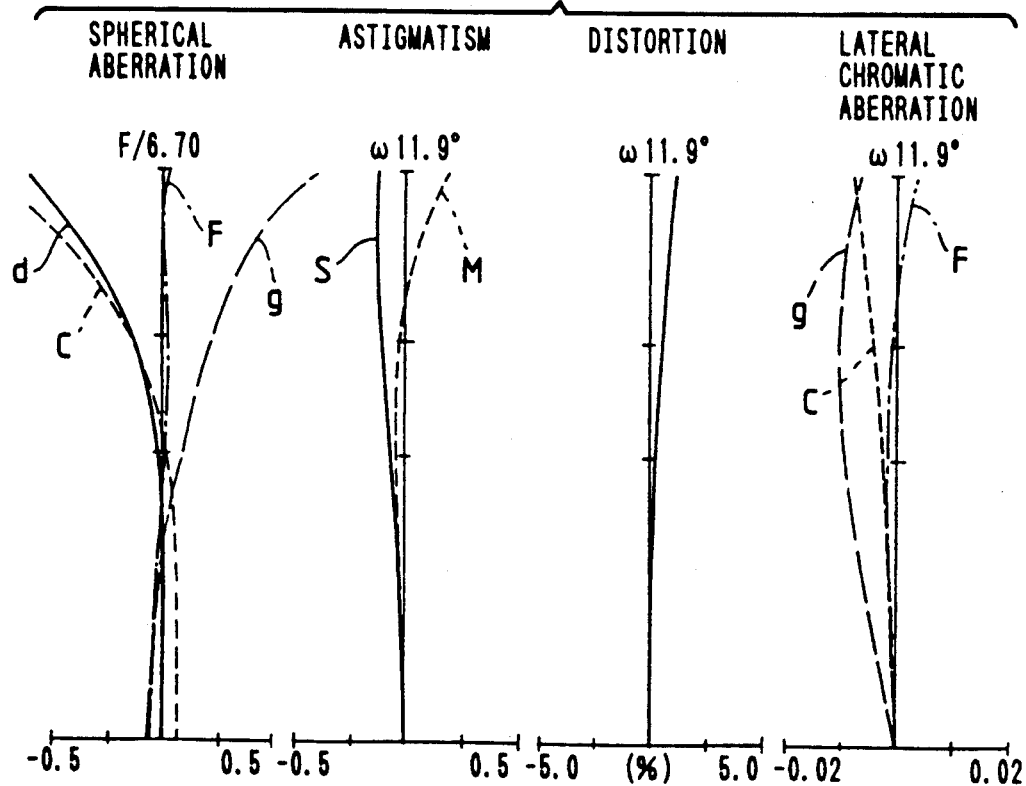
Figure 26:
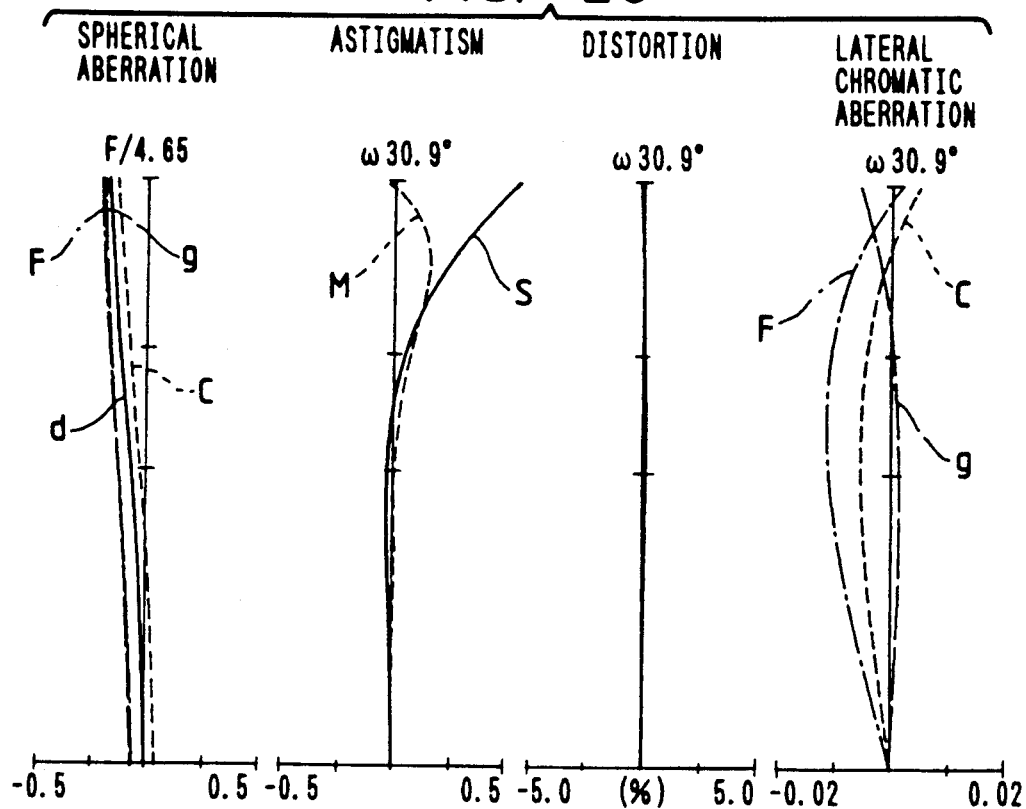
FIG. 26 through FIG. 28 show curves illustrating aberration characteristics of the Embodiment 7 of the present invention.
Figure 27:
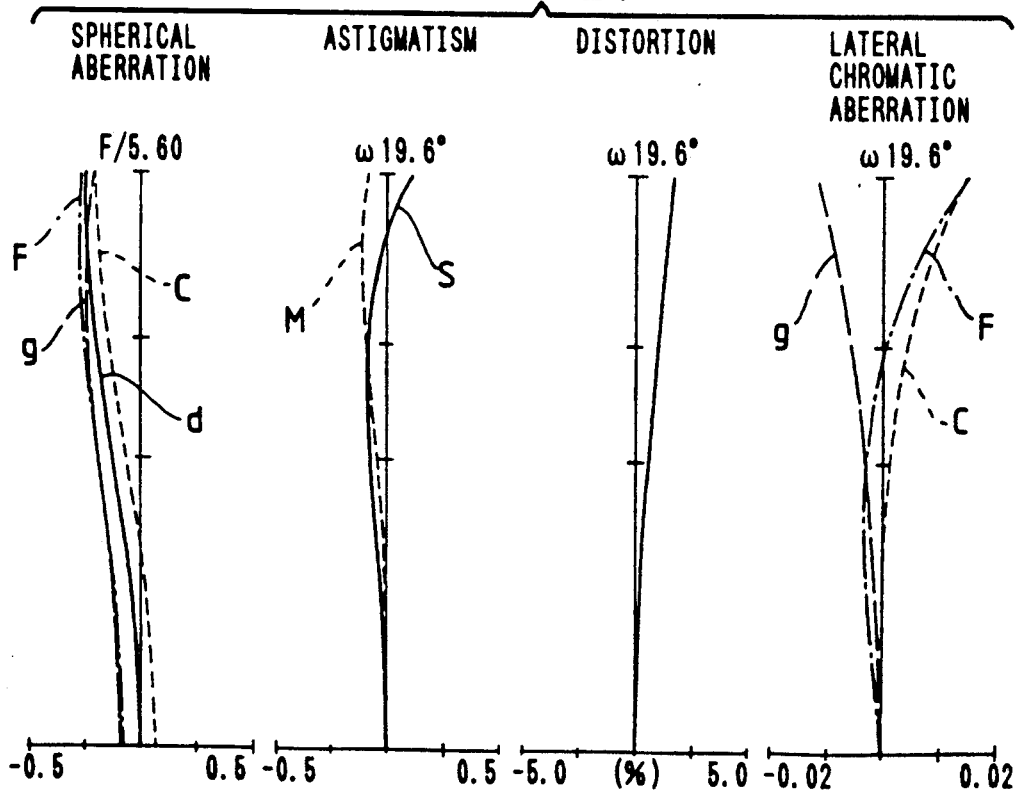
Figure 28:
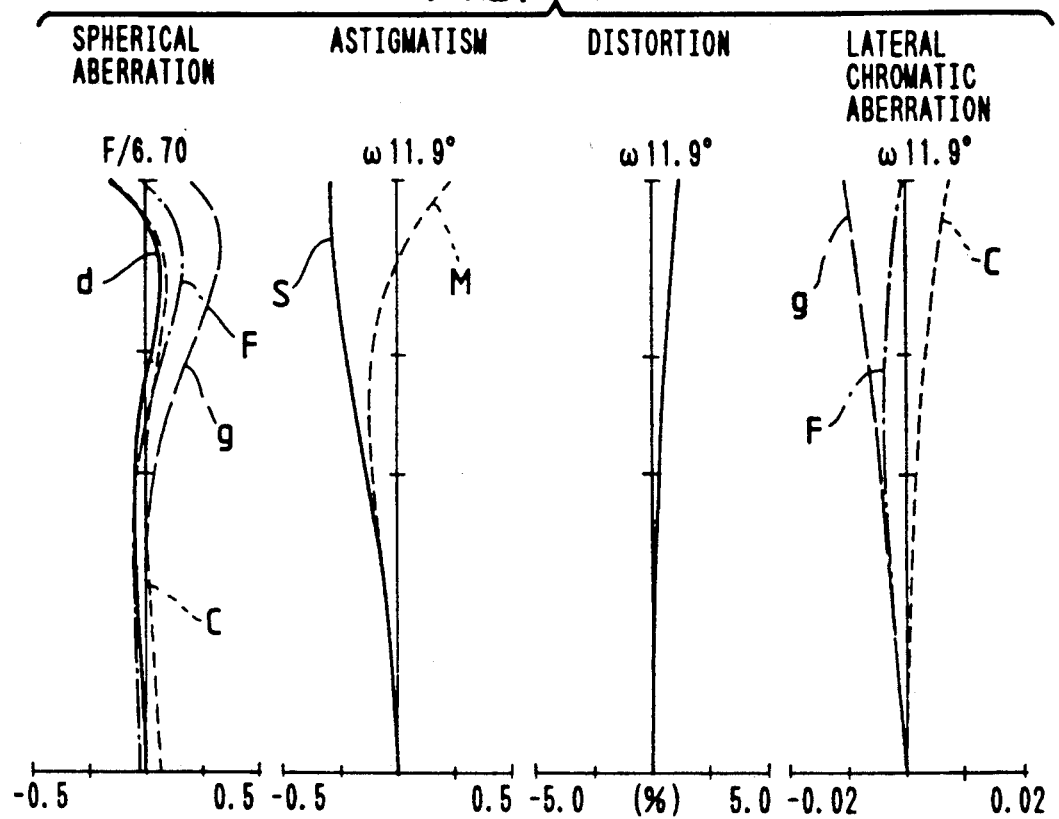
Figure 29:
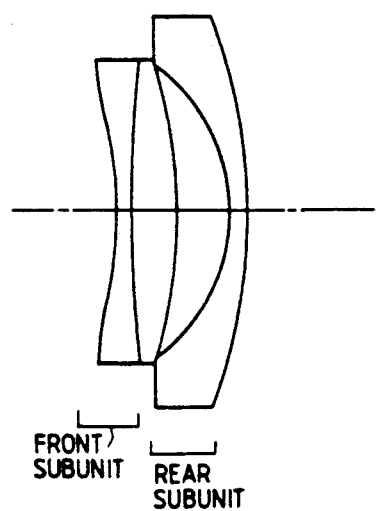
FIG. 29 shows a sectional view illustrating an example of the composition of the negative lens unit arranged at the rearmost location in the vari-focal lens system according to the present invention.

Aberration characteristics at the wide position, intermediate focal length and tele position of the Embodiment 6 are visualized in FIG. 23, FIG. 24 and FIG. 25 respectively.

Figure 7:
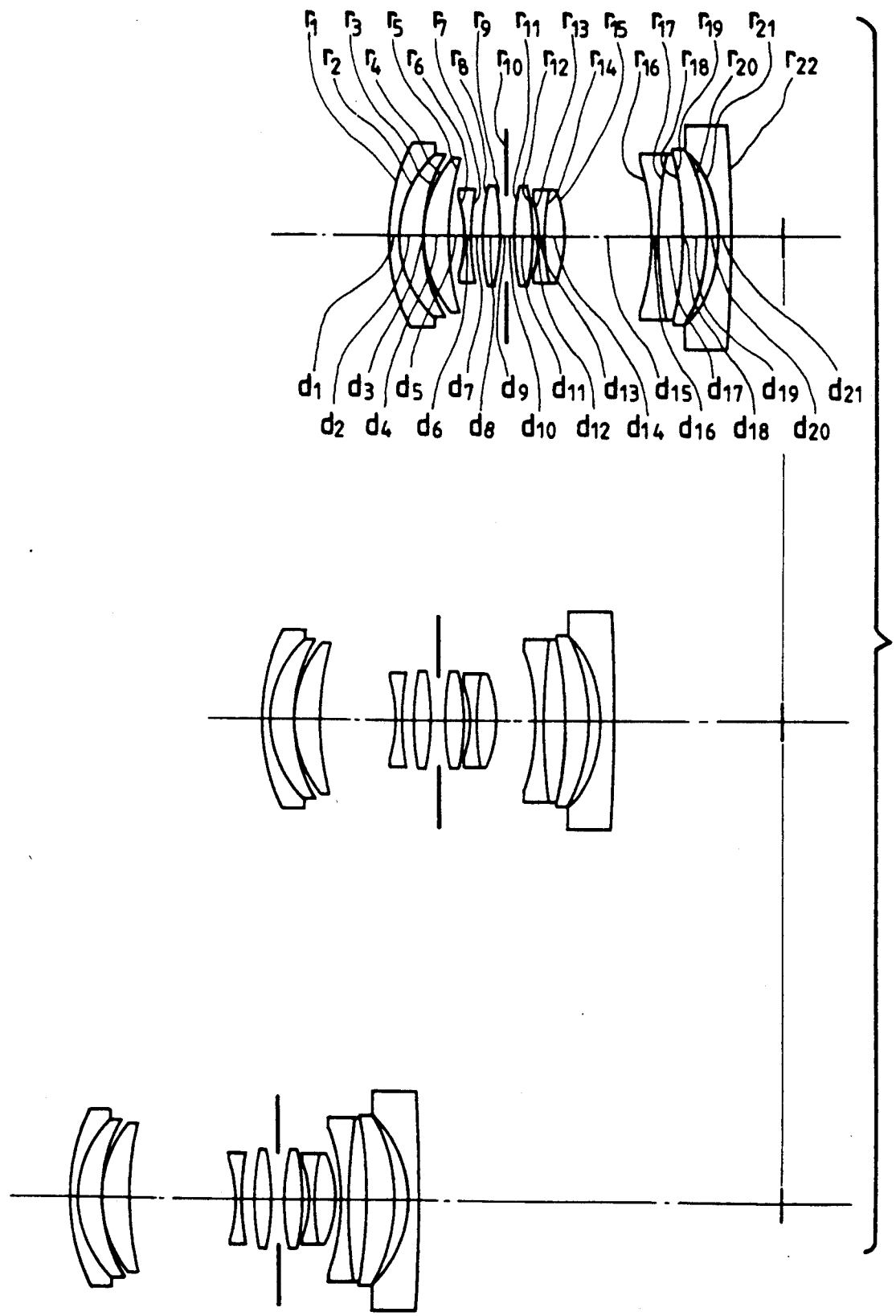

The Embodiment 7 has the composition shown in FIG. 7 wherein the vari-focal lens system comprises, in the order from the object side, three positive, positive and negative lens units, and adapted so as to perform variation of focal length by moving these lens units. The third lens unit is adopted as the negative lens unit arranged at the rearmost location, and is composed of a front subunit which is composed of a cemented doublet consisting of a negative lens element and a positive lens element, and a positive lens element, and a rear subunit composed only of a single negative lens element. The rearmost surface of the front subunit is designed as the aspherical surface.

The Embodiment 7 has the composition wherein two positive lens elements are arranged in the front subunit of the third lens unit. Out of these positive lens elements, the one located on the object side is made of a glass material advantageous for correction of the chromatic aberration, whereas the positive lens element arranged on the image side is made of a glass material which permits manufacturing the aspherical lens element with a press. The design selected for the Embodiment 7 is advantageous for correction of aberrations and facilitates manufacturing of the aspherical lens elements used for that purpose.

As is understood from the foregoing description, the present invention makes it possible to obtain a compact vari-focal lens system which has a vari-focal ratio on the order of 3, aberrations favorably corrected over the entire range from the wide position to the tele position thereof, a telephoto ratio on the order of 1.3 to 1.4 at the wide position and a very short total length.

I claim:

1. A vari-focal lens system comprising a plurality of lens units including a rearmost lens unit having a negative refracting power, said negative lens unit comprising, in the order from the object side, of a front subunit comprising a negative lens element and a positive lens element and a rear subunit comprising at least one negative lens element arranged with an airspace reserved from said front subunit, and said negative lens unit comprising at least one aspherical surface having negative refractive power weakened from the optical axis toward the marginal portion thereof, and said vari-focal lens system satisfying the following conditions (1), (2) and (3):

$$-8 < \phi_N/\phi_T < -3 \quad (1)$$

$$-0.2 < \phi_F/\phi_N < 0.5 \quad (2)$$

$$0.5 < \phi_B/\phi_N < 1.2 \quad (3)$$

wherein the reference symbol $\phi_N$ represents the refractive power of said negative lens unit, the reference symbol $\phi_F$ designates the refractive power of said front subunit, the reference symbol $\phi_B$ denotes the refractive power of said rear subunit and the reference symbol $\phi_T$ represents the refractive power of said vari-focal lens system as a whole at the tele position thereof.

2. A vari-focal lens system according to claim 1 wherein the magnification of said negative lens unit at the wide position of said vari-focal lens system satisfies the following condition:

$$1.2 < \beta_W < 1.6$$

wherein the reference symbol $\beta_W$ represents the magnification of said lens unit having the negative refractive power at the wide position of said vari-focal lens system.

3. A vari-focal lens system according to claim 1 wherein the magnification of said negative lens unit at the tele position of said vari-focal lens system satisfies the following condition:

$$2.4 < \beta_T < 5$$

wherein the reference symbol $\beta_T$ represents the magnification of said lens unit having the negative refractive power at the tele position of said vari-focal lens system.

4. A vari-focal lens system according to claim 1 wherein said aspherical surface has the shape expressed by the following formula when the intersection between said aspherical surface and the optical axis is taken as the origin, the direction along the optical axis is taken as the x axis and the direction perpendicular to the optical axis is taken as the y axis, and satisfies the condition (4) defined below:

$$x = \frac{y^2/r}{1 + \sqrt{1 - p(y/r)^2}} + \sum_{i=2}^{n} A_{2i} y^{2i}$$

$$10^{-3} < \Sigma(|\Delta x|/h) < 0.5 (y = y_{EC}) \quad (4)$$

wherein the reference symbol r represents radius of curvature on the reference sphere of said aspherical surface, the reference symbol p designates the conical constant, the reference symbol $A_{2i}$ denotes the aspherical surface coefficient, the reference symbol $\Delta x$ represents departure from the reference sphere of said aspherical surface, the reference symbol h designates the maximum image height and the reference symbol $y_{EC}$ denotes height on said aspherical surface of the principal ray to attain to the maximum image height.

5. A vari-focal lens system according to claim 4 satisfying the following condition (5):

$$\nu p < 50 \quad (5)$$

wherein the reference symbol $\nu p$ represents the Abbe's number of said positive lens element of said front subunit.

6. A vari-focal lens system according to claim 4 wherein said front subunit consists of a negative lens element and a positive lens element arranged in the order from the object side, and said rear subunit consists only of a single negative lens element.

7. A vari-focal lens system according to claim 4 wherein said front subunit consists of a positive lens element and a negative lens element arranged in the order from the object side, and said rear subunit consists of a single negative lens element.

8. A vari-focal lens system according to claim 4 wherein said plurality of lens units are a first lens unit having a positive refractive power, a second lens unit having a positive refractive power and a third lens unit having a negative refractive power arranged in the order from the object side.

9. A vari-focal lens system according to claim 4 wherein said plurality of lens units are a first lens unit having a positive refractive power, a second lens unit having a negative refractive power, a third lens unit having positive refractive power and a fourth lens unit having a negative refractive power.

10. A vari-focal lens system according to claim 8 or 9 satisfying the following condition (6):

$$1 < \phi_p/\phi_T < 3 \quad (6)$$

wherein the reference symbol $\phi_p$ represents the refractive power of said first lens unit.

11. A vari-focal lens system according to claim 10 wherein an aperture stop is arranged in said vari-focal lens system and the rearmost surface of said rear subunit is concentric with regard to said aperture stop.

12. A vari-focal lens system according to claim 10 wherein said rear subunit consists only of a single negative lens element having a surface concave on the object side.

* * * * *